United States Patent

Joel, Jr.

[15] 3,663,762

[45] May 16, 1972

[54] MOBILE COMMUNICATION SYSTEM

[72] Inventor: Amos Edward Joel, Jr., South Orange, N.J.

[73] Assignee: Bell Telephone Laboratories, Incorporated, Murray Hill, N.J.

[22] Filed: Dec. 21, 1970

[21] Appl. No.: 99,926

[52] U.S. Cl. ................................179/41 A, 325/51, 325/53

[51] Int. Cl. ........................................................H04q 7/00

[58] Field of Search................179/41 A; 325/51, 53, 54, 111

[56] References Cited

UNITED STATES PATENTS 2,734,131 2/1956 Magnuski ...............................325/51

3,355,556 11/1967 Chaney...............................179/41 A

*Primary Examiner*—Kathleen H. Claffy

*Assistant Examiner*—Jon Bradford Leaheey

*Attorney*—R. J. Guenther and James Warren Falk

[57] ABSTRACT

A high capacity cellular mobile communication system arranged to establish and maintain continuity of communication paths to mobile stations passing from the coverage of one radio transmitter into the coverage of another radio transmitter. A control center determines mobile station locations and enables a switching center to control dual access trunk circuitry to transfer an existing mobile station communication path from a formerly occupied cell to a new cell location. The switching center subsequently enables the dual access trunk to release the call connection to the formerly occupied cell.

20 Claims, 19 Drawing Figures

Patented May 16, 1972

3,663,762

12 Sheets-Sheet 1

INVENTOR
A. E. JOEL, JR.
BY Charles H. Davis
ATTORNEY

Patented May 16, 1972

3,663,762

12 Sheets-Sheet 5

Patented May 16, 1972 3,663,762

12 Sheets-Sheet 9

FIG. 5A DIAL TONE CONNECTION
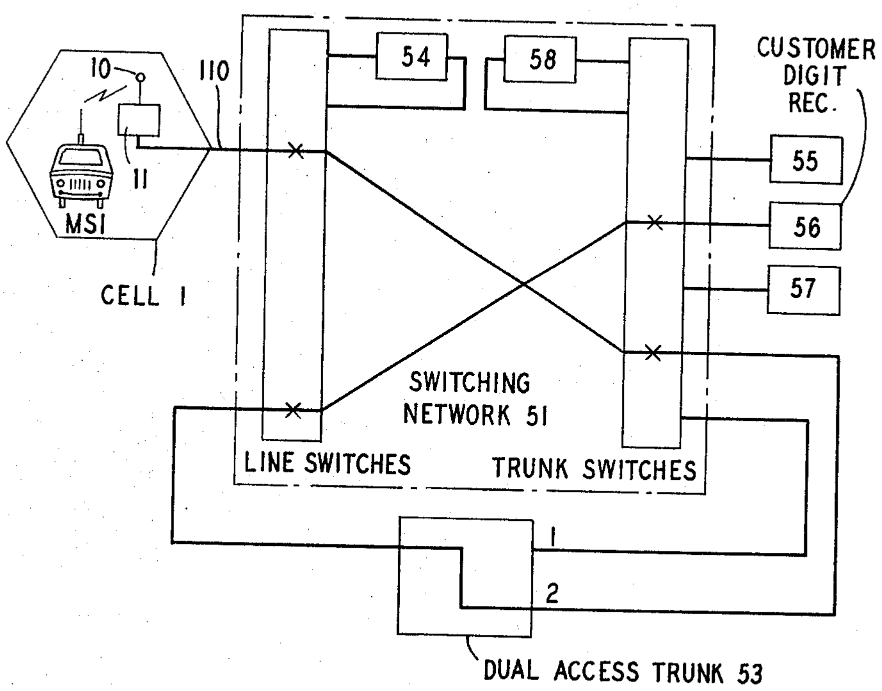
FIG. 5B
COMMUNICATION PATH BETWEEN
MS1 IN CELL 1 AND TELEPHONE STATION LL1
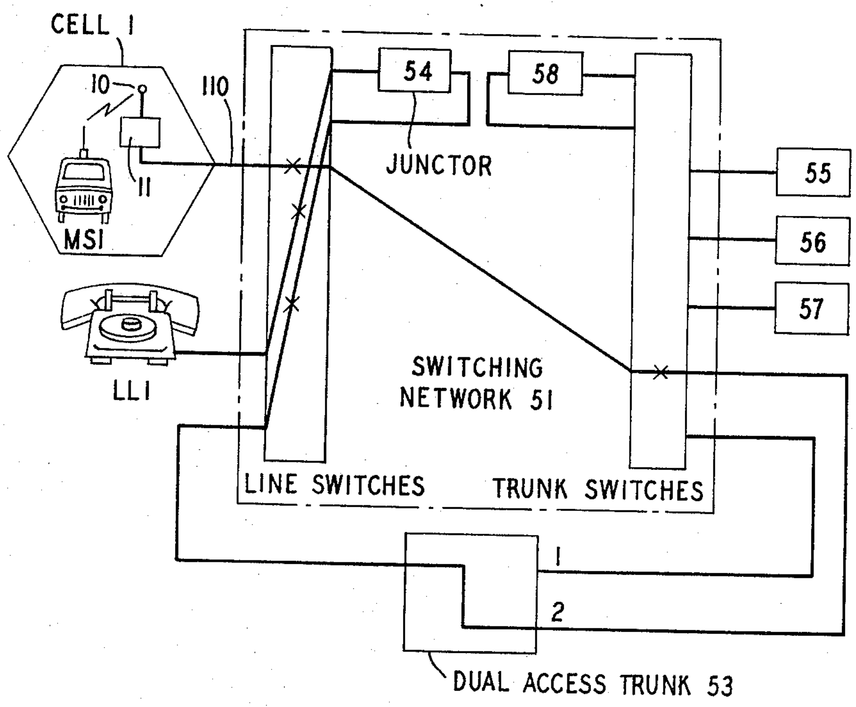

CHANGE OF COMMUNICATION PATH BETWEEN MS1 AND LL2 AS MS1 MOVES FROM CELL 1 TO CELL 2

COMMUNICATION PATH BETWEEN MS1 IN CELL 8 AND LL2

MOBILE COMMUNICATION SYSTEM

BACKGROUND OF THE INVENTION

1. Field of the Invention

This invention concerns mobile communication systems. In particular, it relates to cellular mobile communication systems wherein mobile stations may be located within a plurality of cell transmission areas. In a still more particular aspect this invention is related to communication systems wherein communication paths may be established and continuity of communications maintained between mobile stations and between mobile stations and fixed stations regardless of the movement of the mobile stations between various cell transmission areas.

2. Description of the Prior Art

The literal mobility of communication stations having the ability to move from one location to another has presented problems in prior arrangements which have attempted to furnish adequate communication services to mobile station users. It has long been a goal of mobile communication systems to supply facilities to detect and provide communication service for roaming mobile stations that may be located in different transmission service areas than those to which they are normally assigned. It has further been a goal to provide continuity of communication service between mobile stations and between mobile stations and the telephone direct distance dialing network regardless of the geographical locations of mobile stations.

In the mobile radio art it is the practice for mobile stations to be served by a radio base station which is in turn connected to a switching central office. Communication is effected between the base station and mobile stations by modulating radio carrier waves with intelligence signals. The service zone of the base station is, of course, limited to a certain geographical area, the boundaries of which depend upon the power of the carrier waves and the nature of the terrain.

Basically, the prior art procedure is to assign a plurality of two-way radiant energy radio channels to each base station and to provide each mobile station with radio equipment capable of transmitting and receiving every channel assigned to the base station. In addition, each mobile station permanently assigned to a geographical area served by a base station is given a unique termination identified by a directory number in a conventional switching central office. The switching office is, in turn, connected by transmission lines, hereinafter referred to as land lines, to the base station in order that communication paths may be established between mobile stations and between mobile stations and fixed telephone stations of the telephone direct distance dialing network.

With the growth of mobile communication service, it is necessary to provide communication facilities with low blocking features and more efficient channel utilization of the available radio frequency spectrum. In a large serving area, for example, an area surrounding a metropolitan center, the prior art procedure has been to assign all available radio channel frequencies to high power transmitters located at or near the center of the area. Under this arrangement, an increase in the number of mobile stations necessitates additional radio channels be added until the number of channels is equal to the maximum number of available frequencies. Thus, for a large area, the system is limited by the total number of available radio channels that can be assigned to the area.

A more efficient system may be obtained by dividing a metropolitan center into a number of small serving areas, hereinafter referred to as cell areas, each equipped with low power base transmitters and receivers. In such a system a given radio frequency spectrum assigned to a first base station of one cell area may be assigned to a second base station of another cell area provided that there is sufficient separation between the two cells assigned the same radio frequency spectrum to prevent interference. The reuse of a radio frequency spectrum within a metropolitan center will permit the reuse of available radio channels to serve more mobile stations than heretofore possible with the present mobile communication systems.

In such a system the cell areas may be quite small and mobile stations may traverse several cell areas during the course of a single conversation thereby requiring that communication paths established to mobile stations be transferred from one base station to another without loss of conversation. A prior art automatic mobile radio telephone switching system such as disclosed by R. A. Chaney in U.S. Pat. No. 3,355,556, issued Nov. 28, 1967, is arranged to provide full telephone service features to mobile stations located in a specific cell area. Although the Chaney patent is a substantial contribution to the technology it does not provide continuity of automatic telephone service to mobile stations moving between separate cell areas.

Accordingly a need exists in the art for a mobile communication system capable of locating predetermined mobile stations in a plurality of cell areas each served by a base station. A need also exists for an arrangement to establish and maintain continuity of communication paths extending between mobile stations and between mobile stations and fixed stations as located mobile stations move in and between different cell areas.

SUMMARY OF THE INVENTION

In the exemplary embodiment an electronic data processor is incorporated into a mobile communications system comprising a plurality of base stations each located in individual cell areas. The system is arranged to locate mobile stations in any cell area and to establish communication paths between located mobile stations and between located mobile stations and fixed stations. Apparatus is provided to establish and maintain a record of communication links serving located mobile stations. Additional apparatus is provided to periodically interrogate predetermined cell areas to detect the movement of located mobile stations into new cell areas. Apparatus is also provided to establish and record identity of communication links to the new cell areas and to reassign existing communication paths to new communication links while maintaining continuity of communication service.

In accordance with one feature of my invention directional antenna apparatus is provided in each cell area to locate mobile stations within particular cell areas.

Another feature of my invention is the provision of a stored program electronic data processor to assimilate location information, assign communication links, and process service requests for mobile stations located in a plurality of cell areas.

Another feature of my invention is the provision of switching apparatus wherein communication paths may be established between located mobile stations and between located mobile stations and fixed stations connected to the telephone direct distance dialing network.

In accordance with still another feature of my invention dual access switching apparatus is provided wherein communication paths established over communication links to certain cell areas may be switched onto communication links to other cell areas while maintaining continuity of communications between roaming mobile stations.

DESCRIPTION OF THE DRAWING

The foregoing as well as other objects, features, and advantages, of the invention, will be more apparent from a description of the drawing, in which:

FIGS. 5A through 5F illustrate various communication paths between mobile stations and between mobile stations and fixed telephone stations.

Figures 4A, 4C:
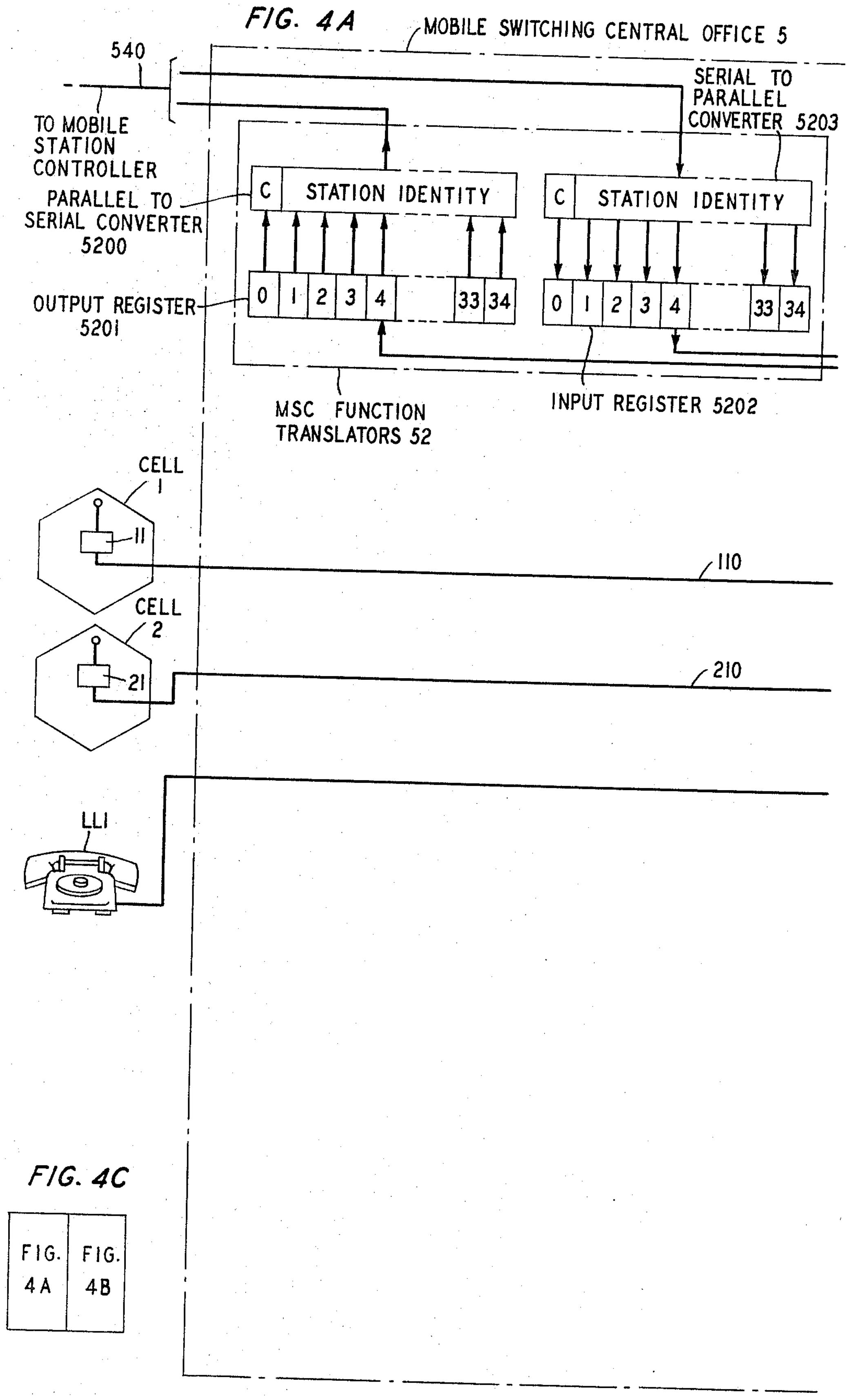
FIGS. 4A and 4B, when arranged in accordance with FIG. 4C set forth a partially schematic drawing of a mobile station switching system.
Figure 4B:
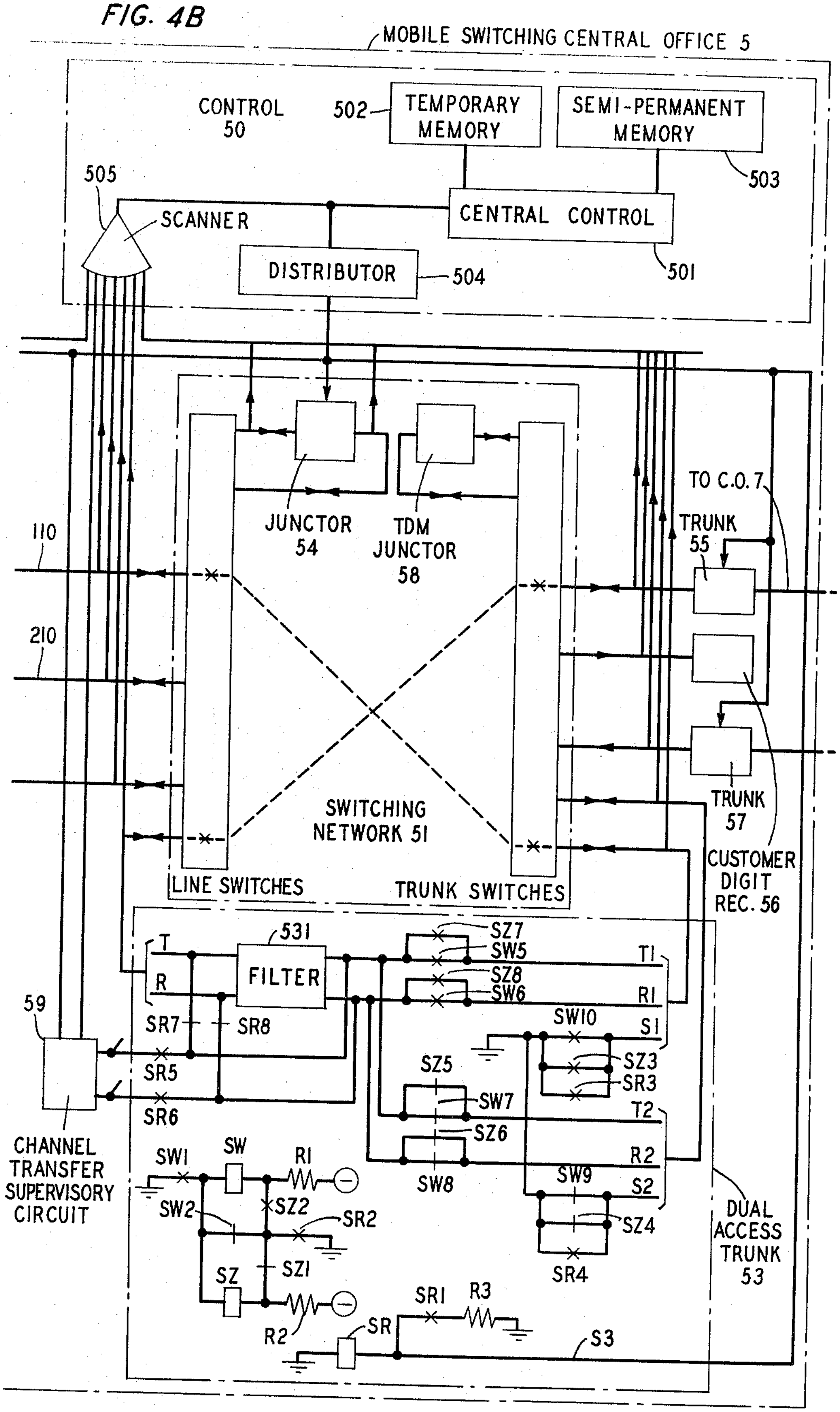

It will be noted that FIG. 4B of the drawing employs a type of notation referred to as "Detached Contact" in which an "X," shown intersecting a conductor, represents a normally open "make" contact of a relay, and a "bar," shown intersecting a conductor at right angles, represents a normally closed "-break" contact of a relay; "normally" referring to the unoperated condition of the relay. The principles of this type of notation are described in an article entitled "An Improved Detached-Contact-Type of Schematic Circuit Drawing" by F. T. Meyer, in the September, 1955 publication of *American Institute of Electrical Engineers Transactions, Communications and Electronics*, Volume 74, pages 505–513.

1. General Description

A. System Operation

Figure 1A:
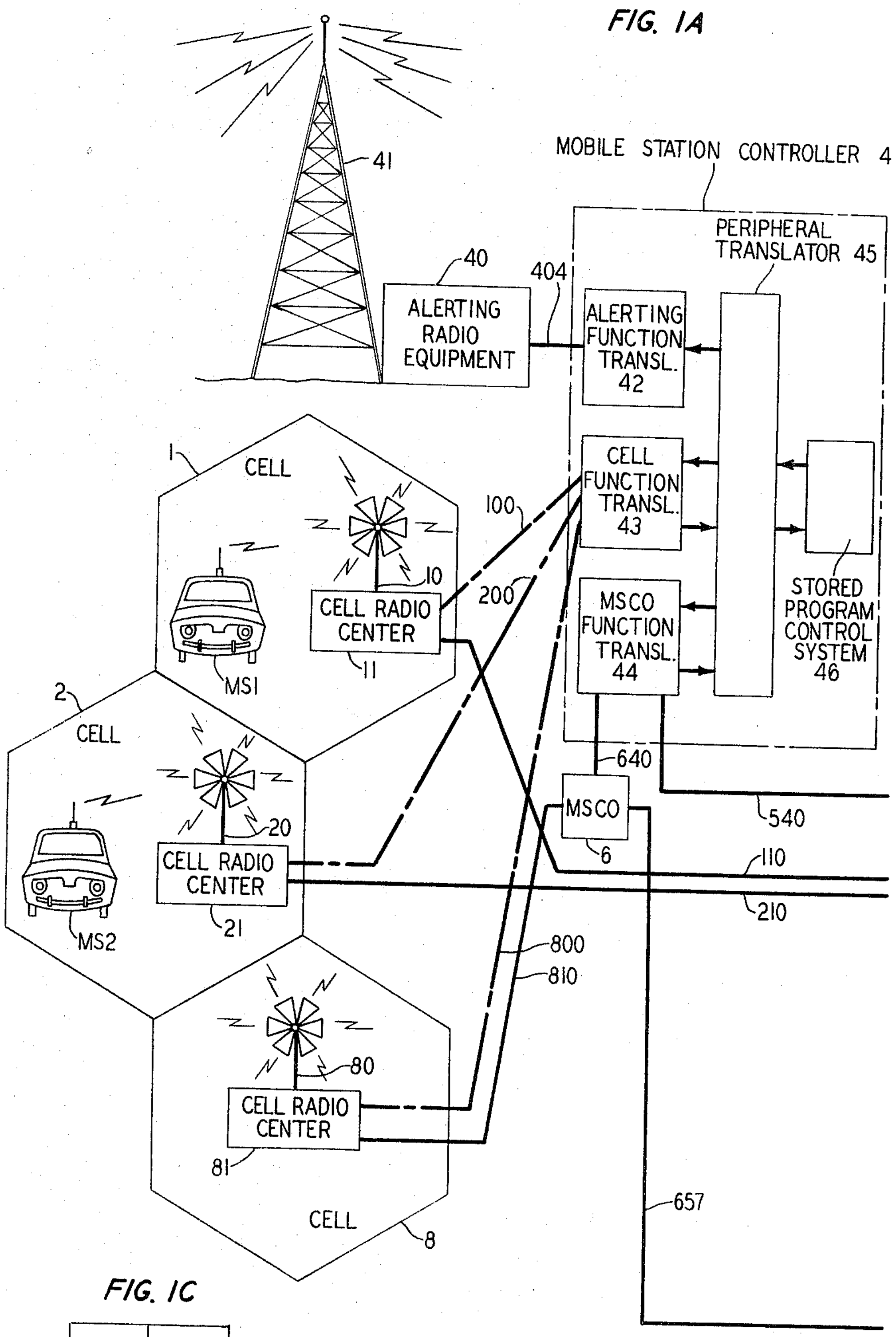
FIGS. 1A and 1B, when arranged in accordance with FIG. 1C set forth a block diagram showing the interrelationship of the various components of an illustrative embodiment of my invention.
Figure 1C:
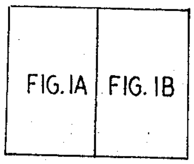
Figure 1B:
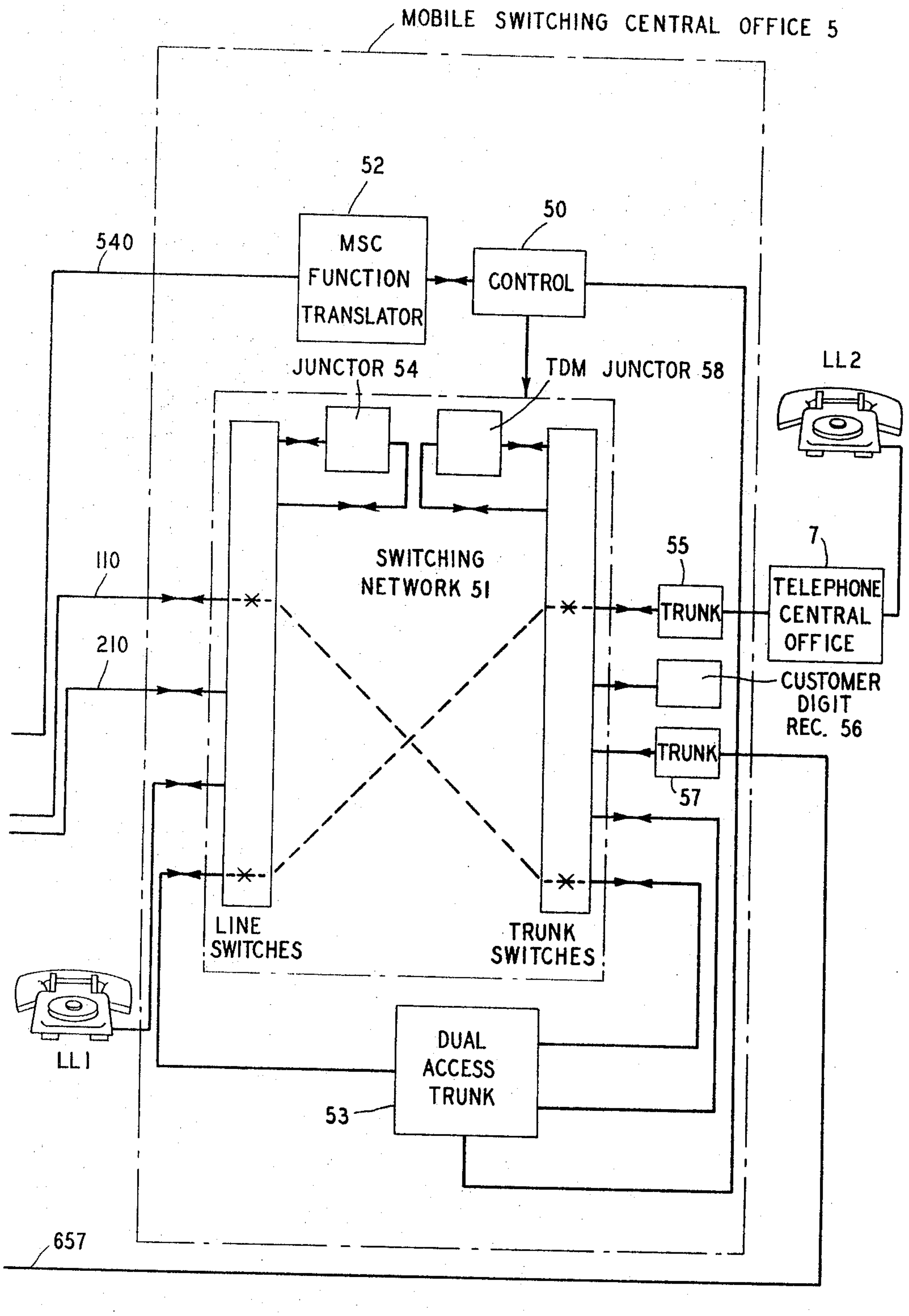

Referring now to FIGS. 1A and 1B of the drawing, it is intended that any given geographical area be subdivided into a number of smaller radio coverage areas hereinafter referred to as cells. It is further intended that each of the cells, shown in FIG. 1A as cells 1, 2 and 8, be provided with a base radio station designated as cell radio centers 11, 21 and 81. Each cell radio center is assigned a two-way radio data channel and a plurality of two-way radio communication channels for the purpose of establishing communication links with mobile stations MS1 and MS2 located within the cell area. The radio channels are transmitted and received by the cell radio centers over directional antenna structures 10, 20 and 80.

Every cell radio center is connected by land data links 100, 200 and 800 to a cell function translator 43 of mobile station controller 4 and by land lines 110, 210 and 810 to mobile switching central offices 5 or 6. Mobile station controller 4 basically comprises a stored program electronic data processor for the purpose of assimilating location information, assigning communication links, and processing service requests for mobile stations such as MS1 and MS2 moving in and between cell areas such as cell areas 1, 2 and 8. Peripheral translator 45, as hereinafter described, interfaces the high speed stored program control system 46 with the slow speed function translators 42, 43 and 44.

A geographical area may have one or a plurality of mobile switching central offices serving the cell areas. For example, the present embodiment assumes that cell areas 1 and 2 are served by mobile switching central office 5 and cell area 8 is served by a similar type of mobile switching central office MSC06. Mobile switching central offices may be of a type designed to exclusively serve mobile stations, or may as in the present embodiment, be a conventional type of telephone switching central office utilized to provide a common switching service for mobile stations MS1 and MS2 in addition to telephone stations LL1 and LL2.

When a conventional telephone switching central office is arranged to handle mobile station switching service, such as mobile switching central office 5, a plurality of dual access trunks, herein represented by dual access trunk 53, is connected as shown to switching network 51. In addition, control 50 is connected by means of MSC function translators 52 and data communication links 540 to the MSCO function translators 44 of mobile station controller 4.

A mobile station places a call, hereinafter described in detail, by seizing the strongest two-radio data channel generated by a near-by cell radio center. The notified cell radio center, and the immediate cell radio centers located adjacent to the notified cell radio center, transmit information to mobile station controller 4 identifying the directional antenna of each cell radio center receiving the strongest seizure signal from the calling mobile station. Mobile station controller 4, under direction of stored program control system 46, assimilates the location information, computes the cell location of the calling mobile station and transmits assignment information to the cell radio center wherein the calling mobile station is located.

Assuming that a calling mobile station, for example MS1, is located by mobile station controller 4 in cell area 1 assignment information, hereinafter called select control information, is received by cell radio center 11. Cell radio center 11 utilizes the select control information to establish a radio communication channel to mobile station MS1 and to connect the communication channel to an assigned land line 110. Mobile switching central office 5 then connects seized land line 110 through switching network 51 to a first one of the trunk appearances and through dual access trunk 53 and the corresponding line appearance to the called station.

Mobile station controller 4, in conformance with program instructions of stored program control system 46, periodically interrogates cell radio center 11 and the immediate cell radio centers surrounding cell radio center 11 to determine if calling mobile station MS1 has changed cell area locations. If mobile station controller 4 determines that mobile station MS1 has changed cell area locations, for example moved into cell area 2, select control information is sent to cell radio center 21 over data links 200 and assignment information is transmitted to mobile switching central office 5 over data communication links 540.

Cell radio center 21 utilizes the select control information to establish a communication link via the assigned radio communication channel and land line 210 to mobile switching central office 5. Mobile switching central office 5, in accordance with the received assignment information, connects the assigned land line 210 to a second trunk appearance of dual access trunk 53. Mobile station controller 4 then directs mobile switching central office 5, in a manner hereinafter described in detail, to switch the line appearance of dual access trunk 53 from the first to the second trunk appearance while maintaining continuity of a communications path between the calling mobile station MS1 and the called station.

On an incoming call to a mobile station, for example mobile station MS1, the called directory number is received by mobile switching central office 5 and transmitted over data communication links 540 to mobile station controller 4. Stored program control system 46 retransmits the called directory number via alerting function translator 42, alerting radio equipment 40, and antenna 41 to all mobile stations located in the geographical area served by mobile station controller 4. Upon receiving the assigned directory number, called mobile station MS1 answers by seizing the strongest two-way radio data channel generated by a near-by cell radio center. In a similar manner as previously set forth, for an originating call, called mobile station MS1 is located by mobile station controller 4 and a communications path is established from the calling station to located called mobile station MS1 via mobile switching central office 5, dual access trunk 53, assigned land line 110, and cell radio center 11 of cell 1.

B. Cell Radio Center

Figure 2A:
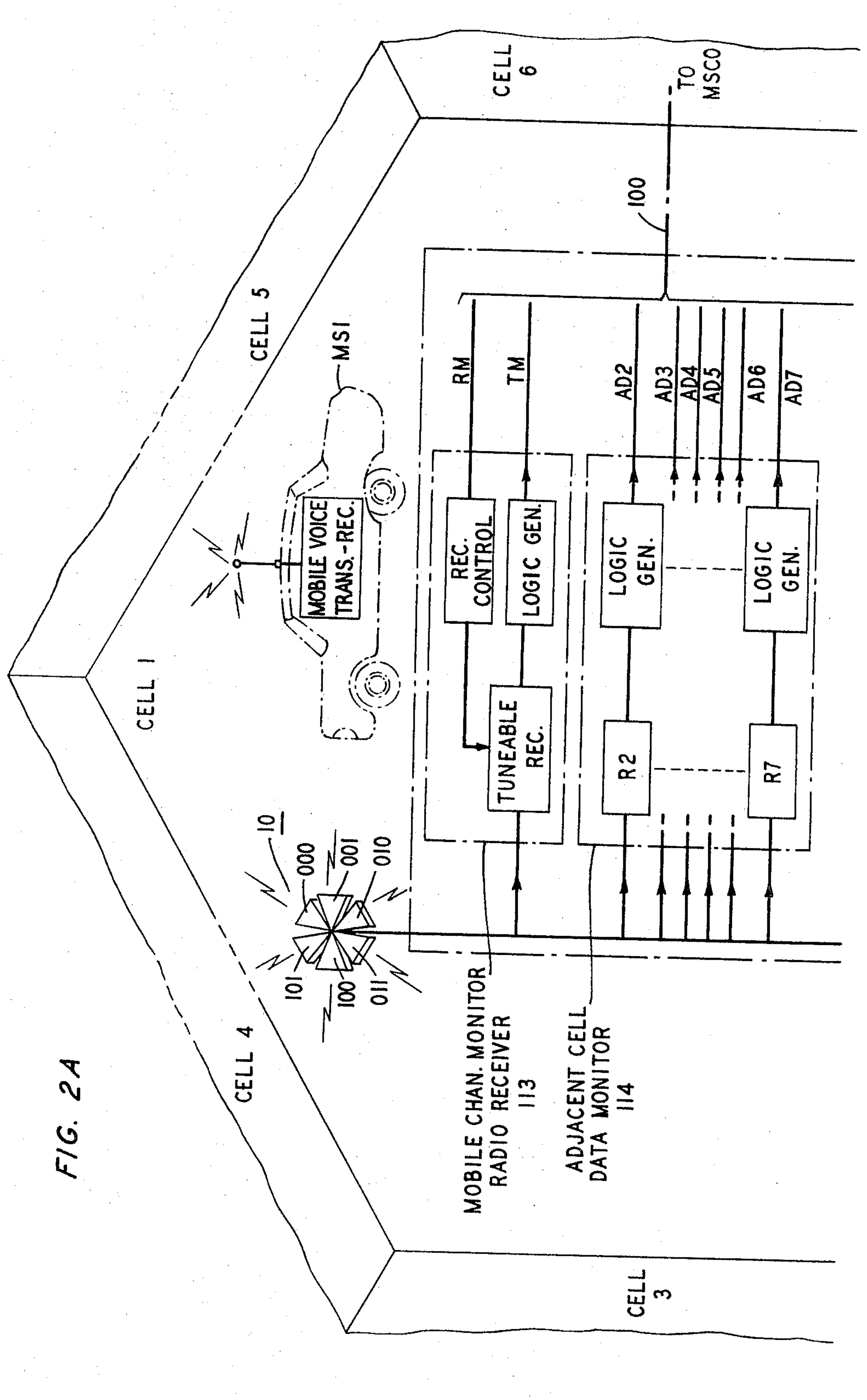
FIGS. 2A and 2B, when arranged in accordance with FIG. 2C set forth the pertinent portions of the control circuitry located within a radio coverage area.
Figures 2B, 2C:
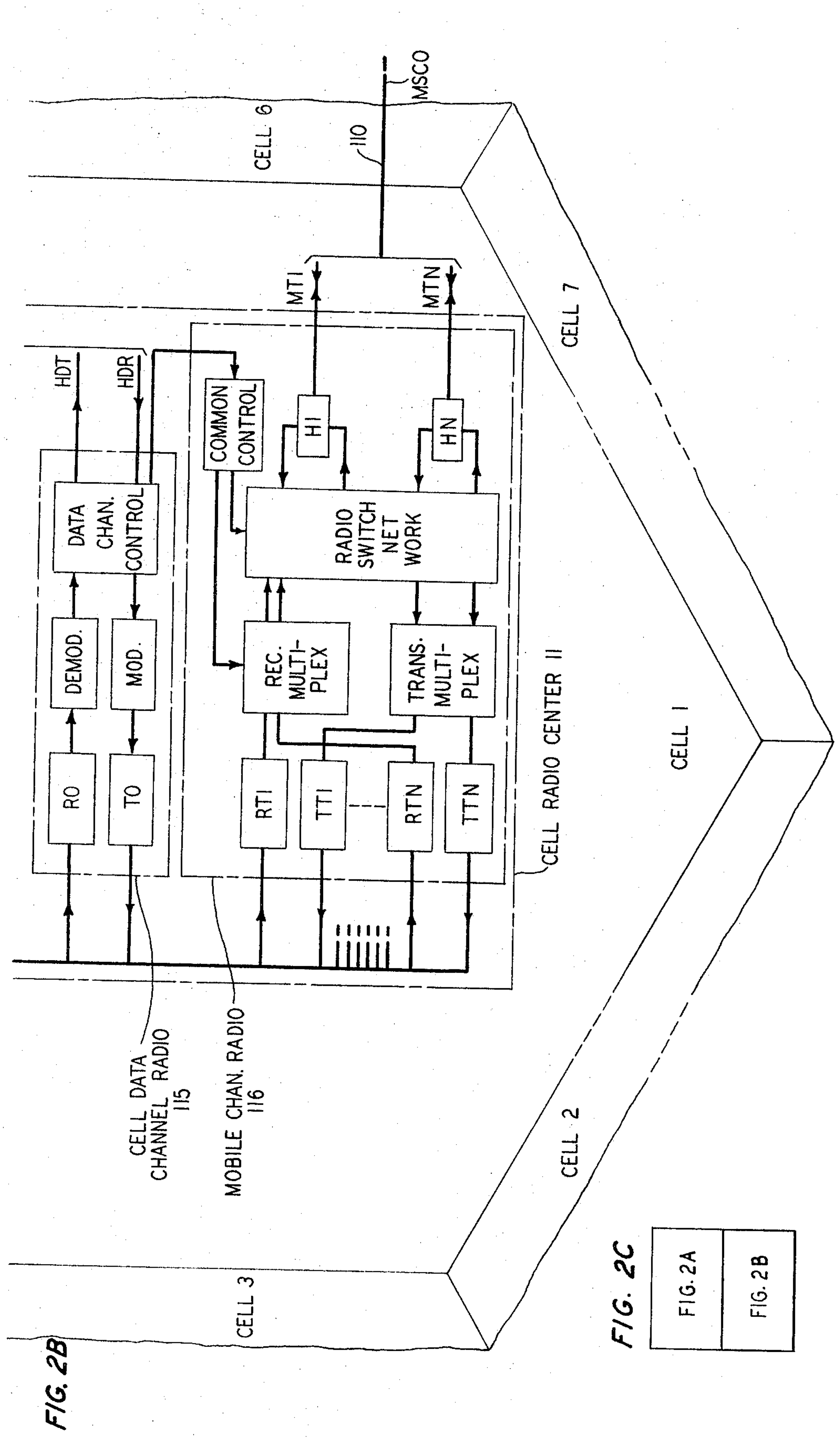

In the present embodiment it is assumed that each cell radio center 11, 21, and 81 is identical in structure to cell radio center 11 shown in FIGS. 2A and 2B. Each cell radio center has a directional antenna structure 10 mounting a group of antennas so that every antenna of the group is facing toward an adjacent cell area. A typical directional antenna structure 10 comprises a cluster of six horn antennas arranged in a circular ground plane to provide six independent overlapping radiating lobes with axis located in the horizontal plane spaced approximately 60° apart. It is also intended that each antenna of every cell directional antenna structure be assigned binary coded digits as shown in directional antenna structure 10 for the purpose of locating a mobile station within a cell area.

Assume, for example, that mobile station MS1 is situated in cell area 1 in the approximate position shown in FIGS. 2A and 2B, and that each cell radio center of cell areas 1 through 7 is located approximately in the center of its respective cell area. Thus, antenna 000 of cell areas 1 and 2, along with antenna 001 of cell area 3, antenna 010 of cell area 4, antenna 011 of cell area 5, antenna 100 of cell area 6, and antenna 101 of cell area 7 are directed toward mobile station MS1. The assigned binary coded digits of each antenna are utilized as hereinafter described to locate mobile stations within any cell area.

In this system each cell radio center, such as cell radio center 11, includes a mobile channel radio 116 comprising a plurality of radio transmitters, TT1 through TTN, and radio receivers, RT1 through RTN, connected to directional antenna 10 for the purpose of establishing two-way radio communication channels between the cell radio center and mobile stations located in the cell area. The same channels may be used simultaneously by more than one cell radio center provided the separation between cells assigned the same channel is sufficient to prevent interference. Due to the low transmitting power of a single cell radio center, a single channel can be allocated to many cells and may carry simultaneous mobile station calls within the given geographical area.

In addition to mobile channel radio 116, each cell radio center is equipped with cell data channel radio 115 connected to directional antenna 10 so that certain control functions described hereinafter may pass over a two-way radio data channel extending between the serving cell radio center and mobile stations located in the cell area. An illustration of a similar type of mobile radio telephone arrangement utilizing a data channel and a plurality of communication channels is disclosed in U.S. Pat. No. 3,355,556, issued Nov. 28, 1967 to R. A. Chaney. It is also intended that every cell radio center be provided with an adjacent cell data monitor 114 comprised of six radio receivers of any standard and well-known design connected to directional antenna 10. Each radio receiver is tuned to receive the radio data channel transmitted from an adjacent cell radio center.

It is further intended that each cell radio center 11, 21, and 81 be equipped with a standard design mobile channel monitor radio receiver 113 tunable to each of the cell's radio communication channels and to each of the radio communication channels assigned to the immediate adjacent cells.

C. Mobile Stations

The present embodiment utilizes a pair of radio data channels and a plurality of selectively employed two-way radio communication channels between each of the cell radio centers 11, 21, and 81 and mobile stations MS1 and MS2 located in the served cell areas 1, 2, and 8. Accordingly, each of the mobile stations, MS1 and MS2, is equipped with a tunable radio transmitter for the purpose of transmitting every radio communication channel that may be received by any of the cell radio centers. In a likewise manner each mobile station is equipped with a tunable radio receiver that may be selectively employed to receive any radio communication channel transmitted by any cell radio center. Thus, as in the present and well-known manner, any one specific mobile station is enabled to establish a two-way radio channel to any cell radio center serving the cell area in which the mobile station may be located.

In addition to the aforementioned transmitter and receiver, it is further intended that each of the mobile stations MS1 and MS2 be equipped with a tunable data transmitter and receiver capable of selecting the transmitted radio data channels generated by every cell radio center. The selection process is accomplished by a signal comparator wherein all of the received radio data channels are scanned using the principle of increasing threshold to choose the strongest unmodulated carrier signal. Once the receive radio data channel has been selected mobile station logic will tune the data transmitter to a predetermined frequency related to the strongest received radio data channel of a serving cell radio center.

Each of the mobile stations MS1 and MS2 is also equipped with a radio alerting receiver tuned to receive an alerting channel generated by alerting radio equipment 40, FIGS. 1A and 1B, and transmitted to every cell area within the given geographical area by means of antenna 41. It is intended that the transmitting power of alerting radio equipment 40 be sufficiently strong so that adequate transmitter coverage is provided for all cell areas within the given geographical area.

D. Mobile Station Controller

The cell radio centers 11, 21 and 81, FIGS. 1A and 1B, are connected by transmission facilities 100, 200 and 800, herein referred to as land data links, to cell function translators 43 of the mobile station controller 4 serving the cell radio centers of a given geographical area. Mobile station controller 4 has a stored program data processor capable of communicating over land data links 100, 200 and 800 to the corresponding cell radio centers 11, 21 and 81 for the principle purpose of locating mobile stations MS1 and MS2. In addition, mobile station controller 4 is utilized to identify calls completing to mobile stations within any cell area and to handle all service requests initiated by mobile stations.

Figure 3A:
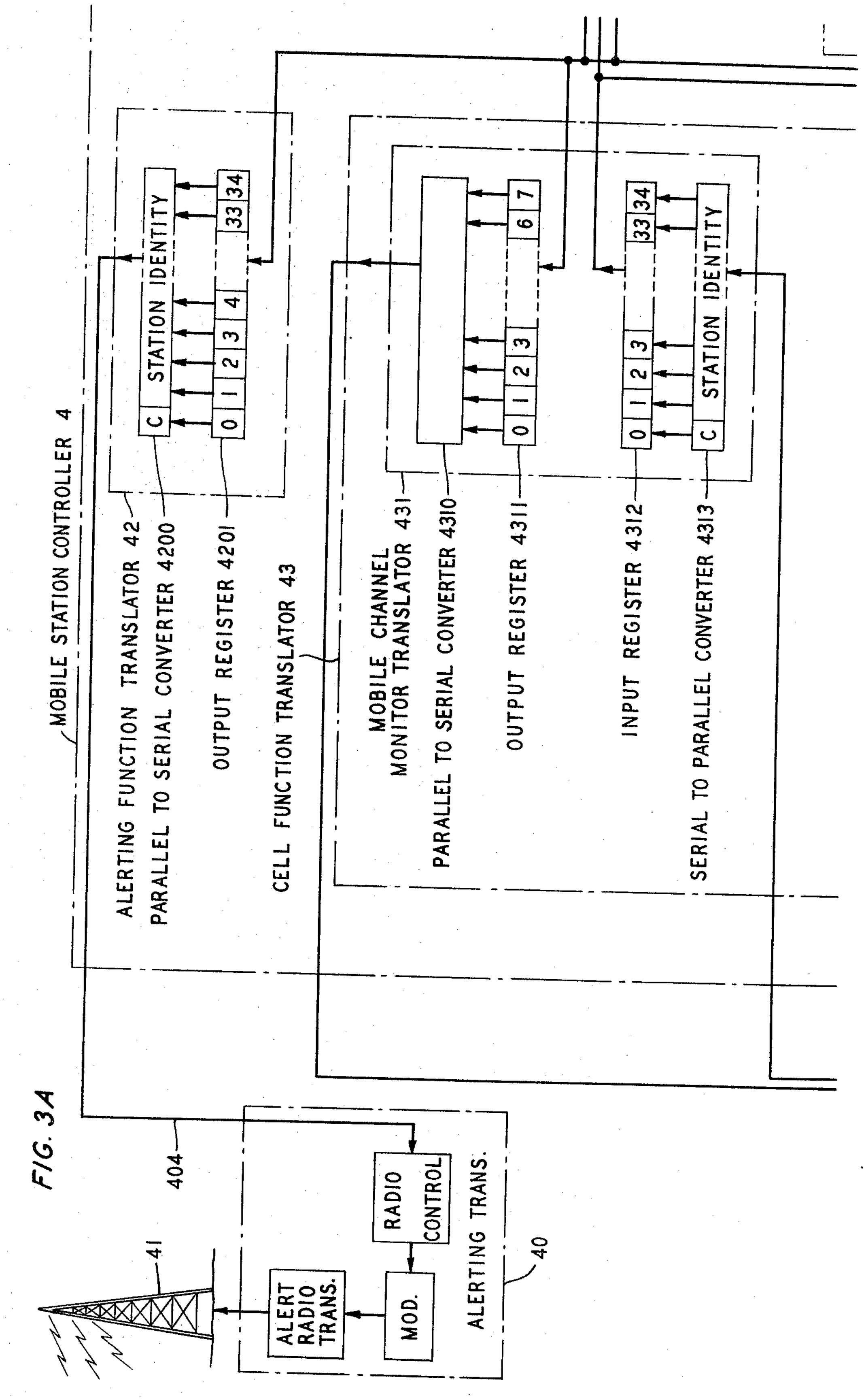
FIGS. 3A through 3C, when arranged in accordance with FIG. 3D, depict a stored program controlled data processor utilized to process mobile station communications service in a plurality of cell radio transmission areas.
Figure 3B:
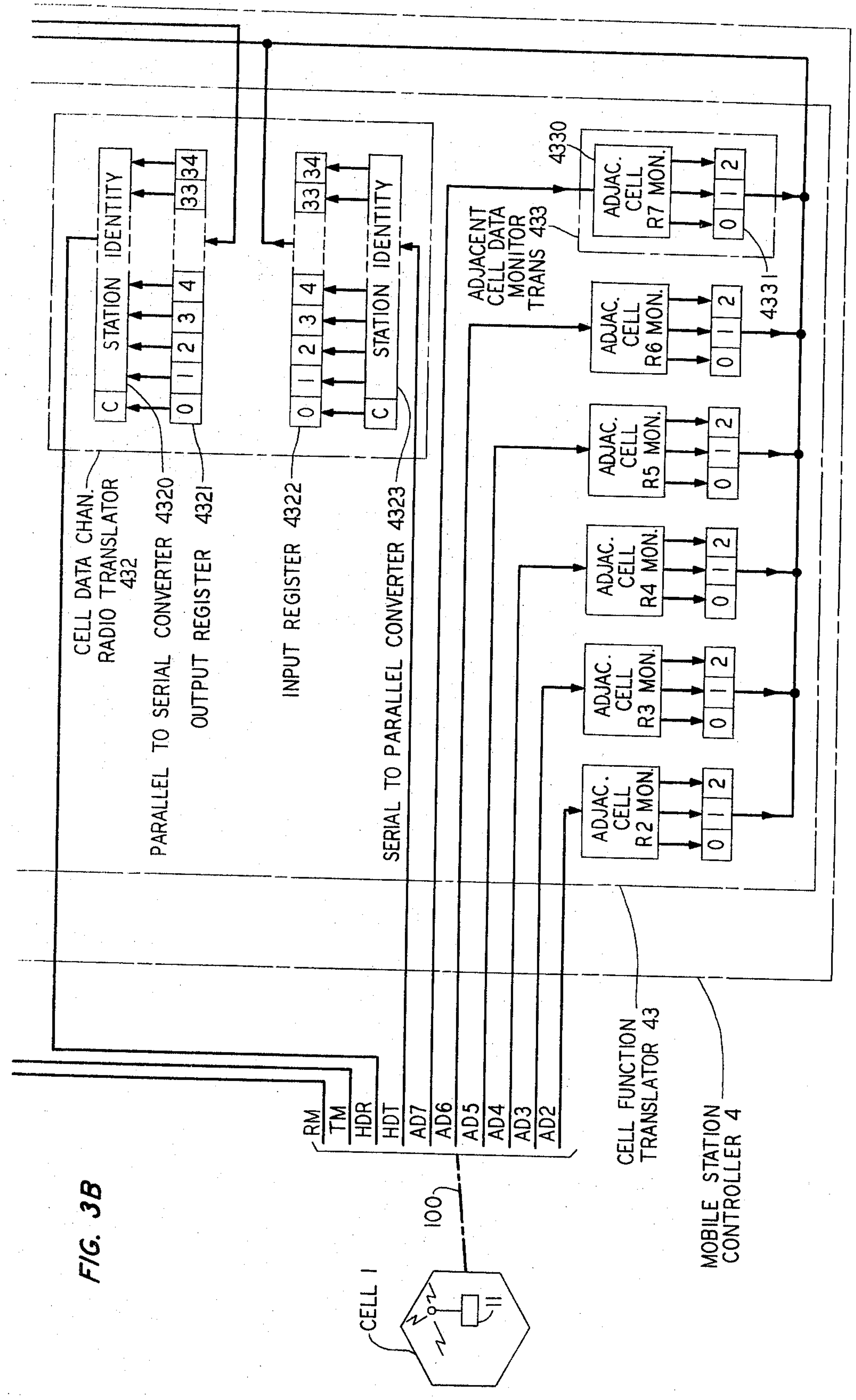
Figure 3D:
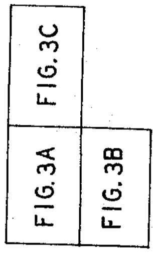
Figure 3C:
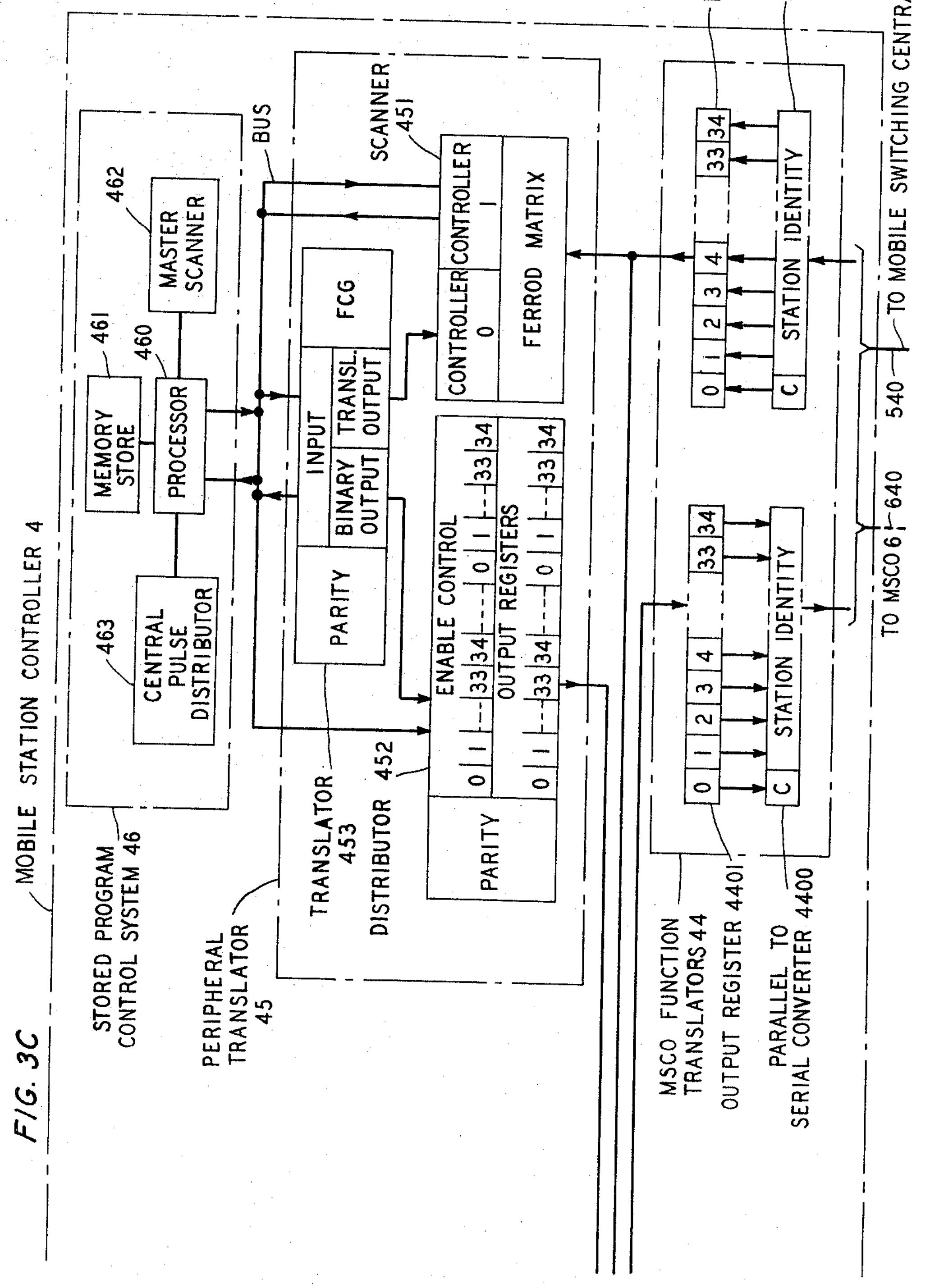

The stored program control system 46, shown in FIGS. 3A, 3B and 3C, is a word-organized electronic data processing system employing an electrically alterable memory for storing both program and call processing data. Many well-known general purpose computers can execute the functions performed by the stored program control system referred to herein, therefore a detailed description need not be given for a full understanding of my invention. Instead, certain parameters of stored program control system 46 will be described generally to give an appreciation of how a typical data processor would be employed in the embodiment of the invention. It is to be understood, however, that my invention is not limited to the data processor being described and that other data processors can be employed in the system without departing from the spirit and scope of the invention.

While stored program control system 46 is a high-speed machine capable of performing many operations within a short interval of time it must function with the slower operating units such as the alerting function translator 42, the cell function translators 43, and the MSCO function translators 44 and serve them on a timed-shared basis. In other words, it must quickly respond to service requests from other equipment units in order that the processing of mobile station calls will not be slowed down to seriously degrade the quality of mobile service.

The stored program control system 46 can, as shown in FIGS. 3A, 3B and 3C, be divided functionally into a processor 460, a memory store 461, a master scanner 462, a central pulse distributor 463, and a maintenance control center (not shown). Also included, but not shown, in mobile station controller 4 is call charging or automatic message accounting (AMA) facilities to record the charges for all mobile station calls within the geographical service area. These units are duplicated and provided with interunit parallel transmission cables commonly referred to as buses to permit the switching of units to improve the reliability within the system.

Processor 460 contains most of the logic and control circuitry for stored program control system 46. It controls the operation of the system by executing a sequence of instructions stored in memory store 461. In addition to carrying out arithmetic operations, such as adding and subtracting, processor 460 can shift, rotate, and perform many logical operations, such as AND, OR, EXCLUSIVE-OR, et cetera.

Memory store 461 is an electrically alterable memory having nondestructive readout capabilities. In addition to being used as a permanent storage facility for programs and for translation of cell and mobile station data, it is also used for temporarily storing call processing data and for establishing a status record pertaining to cell location and assignment information for mobile stations.

Master scanner 462 functions to provide the processor 460 with information as to the status and condition of other system units and will not be described in detail herein. The central pulse distributor 463 is utilized to execute certain processor 460 output commands. For example, processor 460 transmits an address to central pulse distributor 463 which in turn transmits enabling pulses from one of the central pulse distributor's outputs over a dedicated bus to the particular peripheral translator 45 being addressed. The peripheral translator 45 returns verify pulses over the same dedicated bus.

The specific details of the stored program control system 46 have not been disclosed herein and it will be assumed that any suitable data processing machine can be used in my invention. One example of such a stored program control system is disclosed in U.S. Pat. No. 3,570,008 issued Mar. 9, 1971 to R. W. Downing et al.

The peripheral translator 45, shown in FIGS. 3A, 3B and 3C, is provided to interconnect high-speed stored program control system 46 to the slower speed control function translators 42, 43 and 44. Scanners 451 are the input buffers for stored program control system 46 and comprise a ferrod matrix and duplicate controllers for reliability. The ferrod matrix comprises 64 rows of 20 ferrod sensors. The ferrod sensor is a current-sensitive device disclosed in U.S. Pat. No. 3,175,042 issued Mar. 23, 1965, to J. A. Baldwin et al. and is used to monitor scanning leads from various peripheral circuits, such as function translators 42, 43 and 44.

Periodically rows of ferrod sensors in scanners 451 are addressed by stored program control system 46 which in turn receives input data and bids for service over scanning leads from the ferrod matrix. A similar scanner, also using ferrod sensors, is disclosed and described in the U.S. Pat. No. 3,254,157 to A. N. Guercio et al. of May 31, 1966.

Distributor 452 provides output buffers for stored program control system 46 and is used to transmit directive information to function translators 42, 43 and 44. Each distributor 452 comprises enable-control circuits with associated output registers. A parity checking circuit is also provided and each parity circuit can function with up to four distributors.

Interposed between stored program control system 46 and the peripheral units, such as distributor 452 and scanner 451 are translators 453. Translators 453 receive high speed information in binary code from processor 460, makes parity check, and forwards translated information over an address bus to scanner 451. In a similar manner translators 453 transmit untranslated binary information to the associated output registers of distributors 452.

Central pulse distributor 463, under instructions of processor 460, selects a particular scanner 451 by transmitting enable signals over buses to the selected scanner units. The enabled scanner 451 scans the aforementioned ferrod sensor matrix looking for service requests generated by the cell and MSC0 function translators 43 and 44. Upon recognizing a service request, as indicated by the change of state of a ferrod sensor, processor 460 transfers control from a monitor program to an identification program to identify the function translator 43 or 44 requesting service. Having registered the function translator identity processor 460 addresses a particular scanner 451 to read binary information from the identified function translators 43 and 44 by transmitting binary coded information to translator 453. The binary coded information input is converted by translator 453 into the address of the particular ferrod sensors monitoring the output leads of the function translator requesting service and is transmitted to selected scanner 451. At this point, the addressed ferrod sensors detect the states of the output registers of the requesting function translator and transmits the data information therein to processor 460.

Stored program control system 46 transmits control and data information via high speed bus and translator 453 to distributor 452 wherein the information is checked for parity and stored in output registers. Processor 460, in response to program instructions stored in memory store 461, instructs central pulse distributor 463 to enable distributor 452 to transmit the stored information in the distributor output registers to the selected function translator 42, 43 or 44.

The function translators 42, 43 and 44 shown in FIGS. 3A, 3B and 3C are utilized to interface mobile station controller 4 with alerting transmitter radio equipment 40, cell radio centers 11, 21, 81, mobile switching central offices 5 and 6, and if required, other mobile station controllers serving adjacent geographical areas. A single function translator may be utilized to serve a single entity or serve several entities at a single location. For example, alerting function translator 42 is utilized to transmit information to alerting transmitter radio equipment 40. On the other hand, each cell function translator 43 is subdivided into a mobile channel monitor translator 431, a cell data channel radio translator 432, and a plurality of adjacent cell data monitor translators 433 all arranged to serve a single cell radio center. The mobile channel monitor translator 431 is provided to exchange monitor signals and location information with the mobile channel monitor radio receiver of a cell radio center. Cell data channel radio translator 432 transmits to and receives information from the cell data channel radio and the plurality of adjacent cell data monitor translators 433 receive location information from the radio receivers of the adjacent cell data monitor equipment of a cell radio center.

A function translator, such as alerting function translator 42, may be comprised of any type of output register 4201 well known in the art which can be arranged to receive and store binary coded information in a parallel format from distributor 452. Upon recognizing a transmit request such as might be evidenced by binary coded information recorded in predetermined locations of output register 4201, alerting function translator 42 utilizes a parallel to serial converter 4200 in the well known manner to transmit the parallel format information received from distributor 452 in serial format to alerting transmitter radio equipment 40.

A function translator such as cell function translators 43, FIGS. 3A, 3B and 3C, may also be arranged to receive information in a serial format from a cell located remote from mobile station controller 4 and transform the received information into a parallel format that may be detected by scanner 451. For example, adjacent cell data monitor translator 433 receives information coded in a serial format from cell radio center 11 over land data link 100. The serially coded information is converted from a serial to a parallel format by serial-to-parallel converter 4330 and recorded in register 4331. A similar arrangement for converting received information from a serial to a parallel format is disclosed in U.S. Pat. No. 3,543,243, issued Nov. 24, 1970 to W. R. Nordquist. Although the present embodiment utilizes parallel-to-serial and serial-to-parallel converters it must also be recognized that information may be transmitted and received by function translators 42, 43 and 44 in a parallel code format.

Function translators, such as cell function translators 43 may also be comprised of a parallel format output register and associated parallel-to-serial converter transmitter in combination with a serial-to-parallel converter receiver and associated parallel format input register. Thus the cell data channel radio translator 432, FIGS. 3A, 3B and 3C, receives serial format information on the HDT lead from cell radio centers 11, 21 and 81. Serial-to-parallel converter receiver 4323 translates the received information into a parallel code format and records the result in input register 4322 in order that scanner 451 may detect a request for service. Similarly, distributor 452 upon command of stored program control 46, transfers parallel format control information via a connecting bus to output register 4321. Parallel-to-serial converter transmitter 4320 translates the registered information into a serial format and transmits the result over lead HDR to cell radio centers 11, 21 and 81.

In addition to the aforementioned alerting function translator 42 and cell function translators 43, mobile station controller 4 is provided with MSCO function translators 44, FIG. 3C, in order that information may be transmitted and received over data communication links 540 and 640 extending from mobile switching central offices 5 and 6. Although FIGS. 1A and 1B of the drawing only show mobile station controller 4 and mobile switching central offices 5 and 6, it is to be understood that a number of mobile switching central offices may be served by any mobile station controller 4 and that other mobile station controllers, not shown, may be connected to operate with mobile station controller 4.

In summary, mobile station controller 4 receives information from cells 1, 2 and 8 via cell function translators 43 and from mobile switching central offices 5 and 6 via MSC0 function translators 44. The stored program control system 46 periodically scans function translators 43 and 44 and upon detecting service requests executes a sequence of program instructions to set function translators 42, 43 and 44 to transfer control information to cells 1, 2 and 8, alerting transmitter radio equipment 40, and mobile switching central offices 5 and 6.

E. Mobile Switching Central Office

Mobile switching central offices 5 and 6, FIGS. 1A and 1B, are utilized to establish and supervise calls in an automatic manner between mobile stations MS1 and MS2. In a likewise manner, mobile switching central offices 5 and 6 are arranged to interface calls to and from mobile stations MS1 and MS2 with fixed telephone stations LL1 and LL2 of the direct distance dialing network. It is intended that for the purpose of the present embodiment mobile switching central offices 5 and 6 be conventional telephone switching systems of the fundamental type disclosed in detail in the entirety of the September, 1964 issue of the *Bell System Technical Journal*. It is to be noted that the present invention is not limited to use with a telephone switching system of this type but may be advantageously utilized with other types of switching systems. For example, these switching central offices may be separate switching systems or may be a part of an existing switching office having the additional capability for performing mobile service switching functions.

Referring now to FIGS. 4A and 4B, each cell radio center 11 and 21 is connected to the serving mobile switching central office 5, by a plurality of two-way voice communication channels, equal in number to the two-way radio channels assigned each cell radio center. These communication channels, hereinafter referred to as land lines, are represented as lines 110 and 210 extending from cells to individual line appearances on switching network 51 and are utilized as hereinafter described to provide talking and signaling paths for mobile stations MS1 and MS2. In addition, mobile switching central offices are provided with MSC function translators 52 to interface the aforementioned data communication link 540 with mobile switching central office control 50. The MSC function translators 52 provide the same parallel-to-serial and serial-to-parallel converting functions as the aforementioned cell and MSC0 function translators 43 and 44 of mobile station controller 4.

Switching network 51 is also utilized to terminate fixed telephone stations, such as LL1 on line side switch appearances and various types of trunks, such as two-way trunks 55 and incoming trunks 57 on trunk side switch appearances. There is also provided a plurality of dual access trunks 53 each having dual trunk appearances on the trunk side and, in addition, a single line appearance on the line side of switching network 51. Basically, switching network 51, as described in an article entitled "No. 1 ESS Switching Network Plan" by A. Feiner and W. S. Hayward, the *Bell System Technical Journal*, Volume 43, September, 1964, page 2,193, comprises a plurality of line switches and trunk switches and provides for the interconnection of lines and trunks under the directions of control 50. Switching network 51 also provides a plurality of junctors 54 having dual appearances on the line switches and a plurality of tandem junctors 58 having dual appearances on the trunk switches. In addition various service circuits such as customer digit receivers 56, tone sources, signaling detectors, ringing sources and other miscellaneous circuits (not shown) are provided to furnish features normally required in handling telephone calls.

All information processing is handled by control 50, FIGS. 4A and 4B, which is comprised of central control 501, semipermanent memory 503, temporary memory 502, scanner 505, and distributor 504. Semipermanent memory 503 contains the line and trunk translation data and the operating programs required by mobile switching office 5 to process the servicing of call requests. Temporary memory 502 is utilized to store the transient information such as the digits dialed by stations MS1, MS2 and LL1, the idle states of lines and trunks, and other temporary information required to process calls. Central control 501 is the basic supervision mechanism for control 50. In its simplest form central control 501 transmits an address to semipermanent memory 503 and receives a corresponding program instruction to receive information from temporary memory 502 and scanners 505. Central control 501 then performs logical operations on the received information and generates control information to be transmitted to temporary memory 502 and distributor 504.

Input information to central control 501 is provided by scanners 505 which are connected to various points in mobile switching office 5 to detect service requests and supervise the calls in process. Scanners 505 under the direction of central control 501, sample or scan lines, trunks, and various diagnostic points at discrete intervals of time. Detected information such as service requests, dialed digits, and other control information is transmitted by scanners 505 to central control 501 which in turn records the detected information in temporary memory 502 for subsequent use in processing calls.

Distributor 504, FIGS. 4A and 4B, is connected to various points in mobile switching central office 5 where it is necessary that central control 501 be provided with expedient means to operate and release apparatus in trunks, function translators, and various service control circuits. As will be described hereinafter central control 501 addresses distributor 504 to transmit control information to operate or release memory devices in accordance with the stored program instructions of semi-permanent memory 503.

Mobile switching central offices 5 and 6, FIGS. 1A and 1B, are arranged so that calls between mobile stations and between mobile stations and telephone stations of the direct distance dialing network are handled in a manner similar to the service provided by telephone central office 7 to fixed telephone stations such as station LL2. The problem of providing adequate communications service to mobile stations is inherently more difficult in that once a communication path has been established to a mobile station it is necessary that the path be continued even though the mobile station moves to a new cell location prior to terminating a call. Dual access trunks 53, as will be described hereinafter, are provided so that a communication path established between the line appearance and one trunk appearance on switching network 51 may be transferred to the other trunk appearance as a mobile station moves from one cell to another. Thus, mobile stations MS1 and MS2 are provided with service features available to any fixed telephone station of the direct distance dialing network. Furthermore, established calls may be continued for an indefinite period regardless of where the mobile stations may travel within the geographical service area.

2. Detailed Description

A. Originating Call

Whenever a mobile station subscriber, for example, the occupant of the automobile located in cell 1 and designated mobile station MS1, desires to originate a call to a fixed telephone station such as LL1 or LL2 the subscriber places the mobile station in the well-known off-hook condition to initiate a request for dial tone.

Referring now to FIGS. 2A and 2B it is to be noted that cell data channel radio equipment 115 is comprised of a transmitter TO used to generate and continuously transmit the cell radio data channel carrier at the cell assigned frequency to all mobile stations located in the cell area. In a likewise manner the radio centers of all cells are transmitting their respective data channel carriers at the assigned frequencies.

When mobile station MS1 goes off-hook the comparator circuit of the mobile station data channel receiver scans all of the received radio data channel carrier frequencies emitted by the neighboring cell radio centers and selects the strongest unmodulated carrier signal. Upon detecting an idle channel, mobile station MS1 logic tunes the data transmitter to the transmitted radio data channel carrier associated with the selected received frequency and enables the tuned transmitter to send a seizure signal over the data channel carrier to the cell radio center. Each cell radio center has six antennas of directional antenna 10 facing a different direction. Assuming, for example mobile station MS1 is approximately located as shown in FIGS. 2A and 2B and that the strongest received signal is being transmitted by cell radio center 11, the seizure signal transmitted by mobile station MS1 will be received by antenna 000 of directional antenna 10 and detected by receiver R0 of cell data channel radio 115. The signal is demodulated, and translated into binary code 000 representing location information corresponding to the directional antenna receiving the strongest signal by the data channel control of cell data channel radio 115. The location information is transmitted in a serial format on the HDT lead of land data link 100 to mobile station controller 4.

Since each cell radio center has an adjacent cell data monitor similar to the adjacent cell data monitor 114 six other cell radio centers immediately adjacent to cell radio center 1 will detect the seizure signal generated by mobile station MS1.

Thus, each of the cell radio centers of adjacent cells 2 through 7 has a receiver tuned to the received radio data channel assigned to cell 1 which will detect the seizure signal generated by mobile station MS 1. The logic generator of the respective adjacent cell data monitor determines the directional antenna receiving the strongest seizure signal and transmits binary coded location information in serial format over the corresponding cell land data link to mobile station controller 4. For mobile station MS1 located as shown in FIGS. 2A and 2B, each cell radio center of cell areas 2 through 7 will transmit its respective location information, such as antenna codes 000, 001, 010, 011, 100 and 101 to mobile station controller 4. When mobile station MS1 initiates a seizure signal on cell 1 radio data channel location information is generated by cell data channel radio 115 and by each of the adjacent cells 2 through 7 and transmitted over the respective land data links to mobile station controller 4.

Referring now to FIGS. 3A, 3B,and 3C, the binary coded location information from cell 1 is received by mobile station controller 4 on the HDT lead of land data link 100. The serial format information is converted by serial-to-parallel converter 4323 of cell function translator 43 assigned to cell 1 into a parallel format and recorded in input register 4322. In a similar manner additional serial format location information from adjacent cells 2 through 7 is received over corresponding land data links by associated cell function translators 43, converted into a parallel format by an adjacent cell data monitor translator 433 and stored in input register 4331.

The stored program control system 46 under the control of monitor programs detects a request for service by means of scanner 451 observing the receipt of location information in input register 4322 of cell data channel radio translator 432. Upon recognizing a service request, as indicated by the change of states of the bid ferrod sensors, stored program control system 46 transfers control from the monitor program to a mobile station location program. In executing the mobile station location program, processor 460 directs translator 453 to address scanner 451 to transfer the stored location information corresponding to antenna 000 of cell 1 from input register 4322 and the antenna location information obtained from adjacent cell 2 through 7 stored in the corresponding input registers 4331 of the cell function translators 43 assigned to cells 2 through 7 into memory store 461. Processor 460 applies an algorithm to the location information stored in memory store 461 and determines in which cell mobile station MS1 is located.

Although the present embodiment assumes mobile station MS1 initially located in cell 1 area it is also to be recognized that even though physically located in cell 1 area mobile station MS1 may have selected a stronger radio data channel carrier being transmitted by an adjacent cell radio center. Thus, mobile station controller 4 utilizes the location information generated by the adjacent cell data monitors in addition to the location information from cell data channel radio to accurately locate mobile stations within any given cell area.

Once the cell area wherein the off-hook mobile station MS1 has been located, for example, cell 1, processor 460, FIGS. 3A, 3B and 3C of stored program control system 46 addresses and transmits a request identity signal via translator 453 to set an output register of the addressed distributor 452. In response to an enable signal from central pulse distributor 463 the enable control of addressed distributor 452 transmits the request identity information in parallel format from the output register of distributor 452 to set output register 4321 of cell data channel radio translator 432. The request identity signal stored in output register 4321 is converted into serial format by parallel-to-serial converter 4320 and transmitted from cell data channel radio translator 432 on lead HDR via cell function translator 43 and land data link 100 to cell radio center 11. At cell radio center 11, FIGS. 2A and 2B, request identity information received on lead HDR is detected by the data channel control of cell data channel radio 115 and utilized to modulate transmitter TO. The request identity information is then transmitted over directional antenna 10 to mobile station MS1.

Mobile stations MS1 and MS2 are assumed to be assigned a conventional multidigit directory number uniquely identifying the geographical or mobile service area in which the mobile station is permanently assigned, the mobile switching central office serving the cell areas wherein the mobile station may normally be serviced and the identity of particular mobile station itself. Upon receiving the request identity information from cell radio center 11 mobile station MS1, in the well-known manner, transmits the assigned multidigit directory number on the radio data channel of cell 1. The directory number information is received by directional antenna 10 of cell radio center 11 and passed on to receiver R0 of cell data channel radio 115. Following demodulation the directory number information is transmitted by the data channel control over the HDT lead of land data link 100 to input register 4322, FIGS. 3A, 3B and 3C of cell data channel radio translator 43 assigned to cell 1. Stored program control system 46, in the manner set forth above, senses the presence of the directory number in input register 4322 and transfers the number information via scanners 451 into memory store 461 along with the cell location to establish a record of the status of the call originated by mobile station MS1.

Mobile station controller 4, through the operation of stored program system 46, determines the availability of an idle two-way radio channel and voice land line assigned to cell radio center 11 and allocates a selected idle channel and land line for use by mobile station MS1. Select control information pertaining to channel and land line assignments is transmitted from stored program control system 46 by the aforementioned operation of distributor 452 to output register 4321 of cell data channel radio translator 432. The select control information is then transmitted over the HDR lead of land data link 100 to cell 1.

Receipt of the select control information by cell radio center 11, FIGS. 2A and 2B, enables the data channel control of cell data channel radio 115 to perform two functions. First, the received select control information pertaining to the selected idle channel is transmitted by means of transmitter TO and directional antenna 10 to the off-hook mobile station MS1 wherein the received information is utilized to tune the mobile station transmitter and receiver to the selected idle two-way radio channels (separate but co-related radio frequencies may be used for transmitting and receiving). In addition to the first function the select control information is also transmitted to the common control of mobile channel radio 116 wherein the select control information is utilized to establish a connection between the transmitter and receiver associated with the selected radio channel, through the associated multiplex to the selected one of the voice land lines 110.

When the aforementioned connection has been established the off-hook indication of mobile station MS1 is transmitted over the selected two-way radio channel to mobile channel radio 116 and through the radio switch network thereof to one of the hybrids HI through HN and over the selected land line 110 to mobile switching central office 5, FIGS. 4A and 4B.

The receipt of an off-hook indication on land line 110 connected to switching network 51 is detected by scanner 505 which in turn signals central control 501 of the origination of a call on land line 110. Central control 501 in response to program instructions stored in semi-permanent memory 503, identifies the call as being generated by a mobile station which may, at a later time and in a manner hereinafter described, move from one cell location to another. Upon recognizing the call as originating from a mobile station, central control 501 directs distributor 504 to transmit a request identity signal of the mobile station assigned to land line 110 to output register 5201 of MSC function translators 52. The request identity signal is transmitted to the respective MSC0 function translators 44, FIGS. 3A, 3B and 3C, of mobile station controller 4. Stored program control system 46 responds to the request identity signal by interrogating the status record previously established in memory store 461 to identify mobile station MS1 as the mobile station presently assigned to land line 110. The earlier recorded directory number of mobile station MS1 is transmitted by stored program control system 46, via peripheral translator 45 and MSC0 function translator 44 to mobile switching central office 5, FIGS. 4A and 4B, over data communication lines 540. Central control 501 utilizes mobile station MS1 received directory number to establish a call record in temporary memory 502. In addition to transmitting a request identity signal to mobile station controller 4, central control 501 directs scanner 505 to scan dual access trunks 53 and select an idle trunk by noting the absence of an off-hook condition at the dual access trunk line appearances on switching network 51.

In a first idle state it is assumed that the SR, SZ, and SW relays, FIG. 4B, of dual access trunk 53 are released. With relays SW and SZ released ground is placed on the S2 lead of the second trunk side appearance through normal contacts SW9 or SZ4. A communications path extends from the second trunk appearance on switching network 51, over the T2 and R2 conductors, through parallel normal SZ5, SW7, SZ6, SW8 contacts and the T and R conductors to a single line appearance of switching network 51. Scanner 505, under the direction of central control 501, senses the ground on the S2 lead and the absence of an off-hook condition on the T2 and R2 conductors of idle dual access trunk 53. Central control 501 utilizes the ground indication detected by scanner 505 to direct switching network 51 to establish a connection from off-hook land line 110 through the line switches and the trunk switches of the switching network to the T2 and R2 trunk appearance of dual access trunk 53. At this time the off-hook indication is extended from the line appearance of land line 110, to the second trunk appearance of dual access trunk 53 and through the normal SZ5, SW7, SZ6, SW8, SR7, and SR8 contacts to the line appearance of dual access trunk 53 on the line side of switching network 51. In addition, central control 501 records the association of off-hook land line 110 with the second trunk appearance of selected dual access trunk 53 in the call record previously established in temporary memory 502.

Scanner 505, FIGS. 4A and 4B, in response to dial pulse and digit scan programs stored in semi-permanent memory 503, detects the off-hook indication appearing on the line appearance of the selected dual access trunk 53 as a service request. In the well-known manner set forth in the previously referred to September, 1964 issue of the *Bell System Technical Journal*, scanner 505 signals central control 501 of the origination of a mobile station call on the line appearance of dual access trunk 53. Upon receipt of the service request indication control 50 of mobile switching office 5 in the manner described in an article entitled "No. 1 ESS Call Processing" by D. H. Carbaugh, G. G. Drew, H. Ghiron and Mrs. E. S. Hoover, pages 2,483 through 2,531 of the aforementioned *Bell System Technical Journal* connects the line appearance of dual access trunk 53 through the line switches and the trunk switches of switching network 51 to the trunk side appearance of customer digit receiver 56. Dial tone is returned to mobile station MS1 over a path, FIGS. 4A and 4B, extending from customer digit receiver 56 through the line and trunk switches of switching network 51 to the line appearance of dual access trunk 53, over the T and R conductors, the normal SR7, SR8, SZ5, SW7, SZ6, and SW8 contacts to the T2 and R2 conductors of the second trunk appearance of dual access trunk 53, through line and trunk switches of switching network 51 to line appearance of land line 110, over land line 110 to cell radio center 11 and is transmitted by a radio channel over antenna 10 to mobile station MS1. FIG. 5A illustrates a typical dial tone connection extending from customer digit receiver 56 through switching network 51 and dual access trunk 53 to mobile station MS1.

Upon receipt of dial tone off-hook mobile station MS1 forwards the called station directory number by transmitting dialing signals over the above set forth path to customer digit receiver 56 FIGS. 4A, and 4B, of mobile switching office 5. Control 50, in response to the program instructions stored in semi-permanent memory 503, records the called directory digits in the call record of temporary memory 502. The recorded directory digits are examined to determine whether the call is to be completed to local fixed telephone station LL1, or to direct distance dialing network fixed telephone station LL2, or to another mobile station such as mobile station MS2.

In the event mobile station MS1 has dialed the directory number of fixed telephone station LL1, control 50, in the well-known manner, directs switching network 51 to establish a connection through line switches from a line appearance of junctor circuit 54 to fixed telephone station LL1 and directs junctor circuit 54 to apply ringing current over the connection to station LL1. In addition, control 50 directs switching network 51 to release the connection to customer digit receiver 56 and to establish a communication path through line switches from the second line appearance of junctor circuit 54 to the line appearance of dual access trunk 53. When called telephone station LL1 goes off-hook to answer the incoming call ringing signal a two-way communications path, FIG. 5B, extends from station LL1 through the line switches of switching network 51 to junctor circuit 54 then to the line appearance of dual access trunk 53 and over the path previously used for dial tone to mobile station MS1.

If control 50 determines from the called directory number recorded in temporary memory 502 that the call is to be completed to fixed telephone station LL2, central control 501 directs switching network 51 and distributor 504 to establish a connection, FIGS. 4A and 4B from the line appearance of dual access trunk 53 to two-way trunk 55. Then in the well-known manner mobile switching office 5 extends the communications path, FIGS. 1A and 1B, over the direct distance dialing network to called telephone station LL2. In the event the called directory number and the directory number of the calling mobile station MS1 are such that mobile station MS1 is to be charged toll or message units, mobile switching office central office 5 will, in the well-known manner, collect and record all pertinent data related to the charging of mobile station calls and record the charging data on a medium suitable for transportation to an accounting center.

B. Mobile Station Change of Cell Location

In high density cell areas wherein a large number of mobile stations are served by cell radio centers the physical cell area may be quite small. Due to the literal mobility of mobile stations and the smallness of the cell areas it is quite possible that a conversation originally initiated in a first cell may be desired to be continued when the mobile station moves into a second cell area.

Once mobile station controller 4, FIGS. 3A, 3B, and 3B, has recorded a status record of the origination of a call by mobile station MS1, stored program control system 46 initiates a monitoring sequence to identify the present cell location of the calling mobile station. Periodically processor 460 in conformance with program instructions stored in memory store 461 transmits a monitor signal identifying the assigned transmitting radio channel frequency to peripheral translators 45 for subsequent transmission to cell 1 and adjacent cells 2 through 7. Peripheral translators 45 in response to enable signals from stored program system 46 transfer the monitor signal to output registers 4311 of cell function translators 43 assigned to each of cell areas 1 through 7. Mobile channel monitor translators 431 transmit the monitor signal over the RM lead of the land data links to the cell radio centers of cells 1 through 7.

Referring now to FIGS. 2A and 2B receipt of the monitor signal by one of cell radio centers, for example, cell radio center 11, on the RM lead directs the receive control of mobile channel monitor radio receiver 113 to tune the tunable receiver to the frequency of the transmitting radio channel now assigned for use by mobile station MS1. In a similar manner, the turnable receivers of the mobile channel monitor radio receivers of adjacent cells 2 through 7 are also tuned to the same channel frequency. The received frequency of the two-way radio channel transmitted by mobile station MS1 is detected by the directional antennas of the cell radio centers for cell areas 1 through 7 and given to the corresponding mobile channel monitor radio receivers. The relative strength of the received communication signal being generated by mobile station MS1 is determined by the tunable receivers. Logic generators then translates this data into binary coded location information corresponding to the directional antenna receiving the strongest signal. Each of cell areas 1 through 7 transmits a location signal on the TM lead of a land data link to mobile station controller 4. Stored program system 46, FIGS. 3A, 3B and 3C, detects in the aforementioned manner as described for the initial seizure signal, the location information recorded in input registers 4312 of cell function translators 43 and determines the mobile station MS1 location in conformance with program instructions stored in memory store 461. If stored program system 46 determines that mobile station MS1 is still located within cell 1 area, no further action will be taken by mobile station controller 4 at this time.

In the event mobile station MS1 has moved into a new cell area, for example, cell 2, stored program control system 46 will compute the new cell location from the binary coded information received by cell function translators 43. Processor 460 then proceeds to select an idle two-way radio channel assigned to cell radio center 21 and an idle land line 210 extending from cell radio center 21 to mobile switching central office 5. The processor may wait for a period of time for a verification that the movement from cell 1 to cell 2 is not due to a momentary shift in radio signals. Select control information relating to the radio channel and land line assignments is transmitted via peripheral translator 45 to the cell function translators 43 assigned to cell 2. The select control information is then transmitted over the HDR lead of land data link 200 to the cell data channel radio equipment of cell radio center 21. The data channel control of cell data channel radio directs the common control unit of the mobile channel radio to connect the assigned idle two-way radio channel to the assigned land line 210. At this time a communications channel extends through directional antenna 20, to the mobile channel radio of cell radio center 21, and over land line 210 to the line side of switching network 51 of mobile switching central office 5.

In addition to transmitting select control information to cell 2, stored program control system 46 of mobile station controller 4 transmits the identification of land line 110 and the new land line 210 assignment information to mobile switching central office 5 over data communication links 540. Upon receipt of the assignment information by MSC function translators 52, FIGS. 4A and 4B, central control 501 of control 50 interrogates the call record of mobile station MS1 stored in temporary memory 502 and ascertains that the present connection is established over land line 110 through switching network 51 to the second trunk appearance of dual access trunk 53. Central control 501 then enters the new assignment information into the call record and proceeds to direct switching network 51 to establish a connection from the line appearance of land line 210 to the first trunk appearance of dual access trunk 53. Upon accomplishing the foregoing connection, control 50 transmits a completion signal via MSC function translators 52 and data communication links 540 to mobile station controller 4, FIGS. 3A, 3B, and 3C. In a likewise manner cell radio center 21 transmits a similar completion signal over land data link 200 to mobile station controller 4 indicating that the assigned radio channel of cell 2 has been connected to the idle land line 210.

Stored program control system 46, upon receiving completion signals from mobile switching central office 5 and from cell radio center 21, transmits an execute signal via peripheral translators 45 to MSC0 function translators 44. The execute signal is transmitted by MSCO function translators 44 over data communication link 540 to MSC function translators 52. Upon detecting the execute signal stored in input register 5202, FIGS. 4A and 4B, central control 501 directs distributor 504 to place momentary battery on the S3 lead to operate the SR relay of dual access trunk 53. Relay SR is a magnetic latching relay and is operated and released as described in the article entitled "No. 1 ESS Scanner, Signal Distributor, and Central Pulse Distributor" by L. Freimanis, A. M. Guercio and H. F. May in the September 1964 issue of the *Bell System Technical Journal*. The operation of the SR relay grounds the S1 lead through make contact SR3 and prepares a lock indicating path extending through make contact SR1 and resistor R3 to ground. The SW relay operates over a path extending from ground, through the SR2 make contacts, the normal SW2 contacts, the SW coil winding, and the R1 resistor to battery. The SW relay in operating extends the communication path from the line appearance of dual access trunk 53 through the normal SZ5 and SZ6 contacts to the second trunk appearance to a new path extending from the line appearance through the SW5 and SW6 make contacts to the first trunk appearance of dual access trunk 53. During the operation of the SW relay, the SZ relay was held inoperative by ground extending through the SR2 make contact and the SW2 and SZ1 normal contacts to both sides of the coil winding of the SZ relay.

When distributor 504 has been notified that relay SR has operated and is magnetically held, central control 501 prepares to inform mobile station MS1 to transfer from the assigned channel in cell 1 to the newly assigned channel in cell 2. This information is sent to the mobile station by channel transfer supervisory circuit 59, which is common to all dual access trunks 53 in mobile switching office 5. Central control 501 and the associated program in memory 503 is arranged to insure that only one dual access trunk 53 is connected to channel transfer supervisory circuit 59 at a particular time. This means that only one dual access trunk SR relay is operated to connect the output of channel transfer supervisory circuit 59 through make contacts SR5, SR6 and normal contacts SZ5, SZ6 through switching network 51 and land line 110 to cell radio center 11, FIGS. 2A and 2B, over mobile channel radio 116 and directional antenna 10 which is the communication path that has been used by mobile station MS1 since the origination of the call. At the same time normal contacts SR7 and SR8 are operated to place filter 531, FIGS. 4A and 4B, in the communications path to the line appearance of dual access trunk 53. Filter 531 prevents control signals generated by channel transfer supervisory circuit 59 from being transmitted over the line appearance to another station but permits communication signals to pass through dual access trunk 53.

Central control 501 now consults temporary memory 502 to obtain the new radio channel number of cell 2 which has been assigned to this call by mobile station controller 4 and transmits the number, via distributor 504, to channel transfer supervisory circuit 59. The channel transfer supervisory circuit 59 generates control signals over the communications path just described to mobile station MS1. Upon receipt of the control signals mobile station MS1 tunes to the newly assigned radio channel of cell 2 and establishes a connection over land line 210 through switching network 51 and make contacts SW5 and SW6 of dual access trunk 53.

A supervisory signal is now generated by mobile station MS1 and detected by channel transfer supervisory circuit 59 as an indication that the transfer has been completed. Scanner 501 detects this signal and central control 501 enables distributor 504 to start the release of relay SR in dual access trunk 53. A signal is placed on lead S3 to release the magnetically held relay SR. Release is detected by the opening of contact SR1. With the release of relay SR the channel transfer supervisory circuit 59 is disconnected from dual access trunk circuit 53 at make contacts SR5 and SR6. Contact SR2, in opening, removes the shunt around the winding of relay SZ. SZ relay now operates over a path extending from ground through SW1 make contact, the SZ relay coil winding, and the R2 resistor to battery. With the operation of the SZ relay following the operation of the SW relay and the release of the SR relay, ground is removed from the S2 lead of the second trunk appearance of dual access trunk 53. In addition, normal contacts SZ5 and SZ6 open the transmission path T2 and R2 to the second trunk appearance on switching network for possible future use.

Figures 5C, 5D:
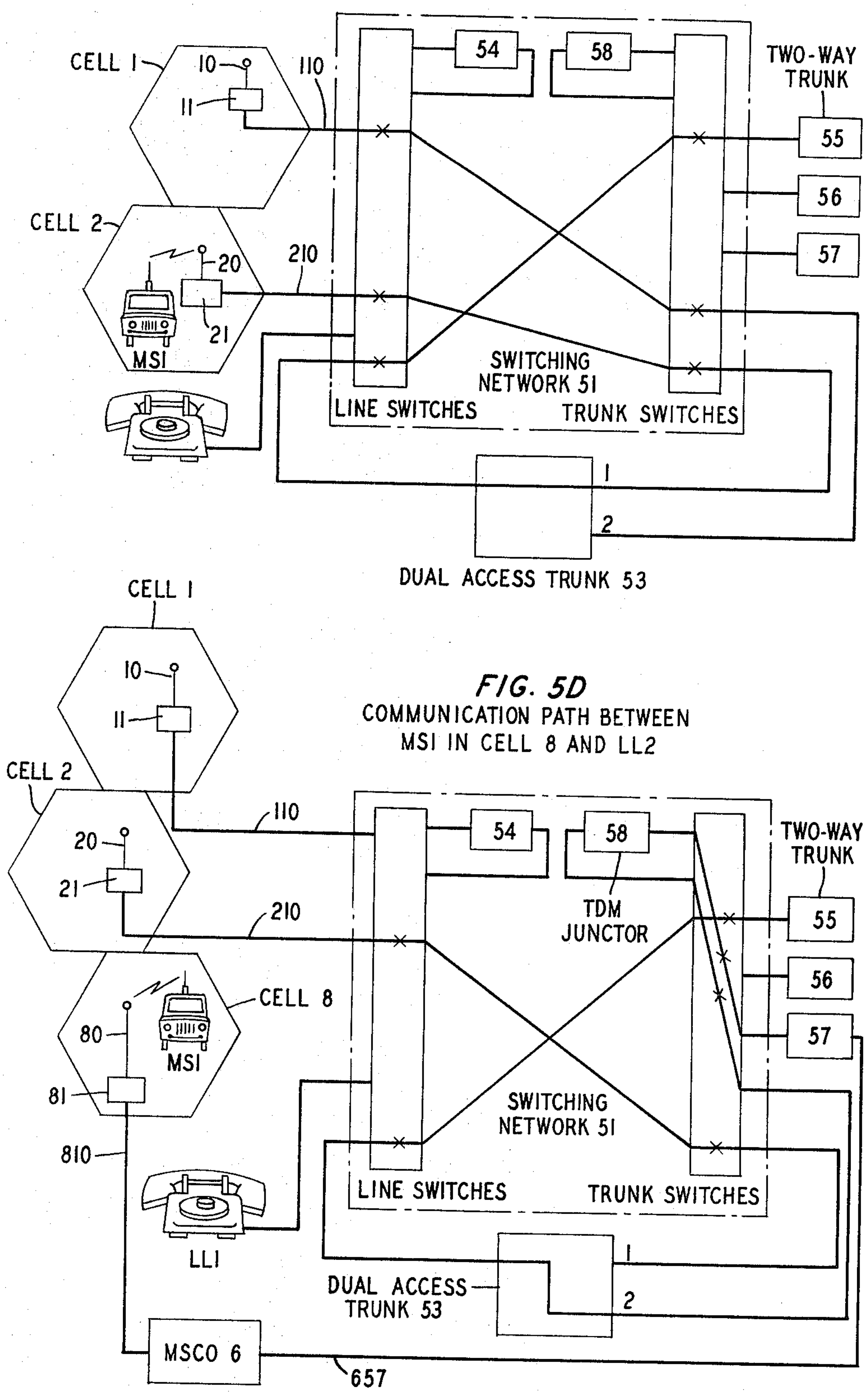

The communication path, FIG. 5C, assuming mobile station MS1 is conversing with fixed telephone LL2 now extends from mobile station MS1 over the new two-way radio channel to antenna 20, through mobile channel radio of cell radio center 21 and over land line 210 to switching network 51 of mobile switching central office 5. The communication path continues via the line and trunk switches of switching network 51 through the first trunk appearance of dual access trunk 53, to the line appearance of dual access trunk 53 and through switching network 51 over the previously established connection via two-way trunk 55 to the called fixed telephone LL2.

Central control 501, FIGS. 4A and 4B, recognizes through the operation of scanner 505 that the connection to land line 110 has been released by the removal of ground on the S2 lead of dual access trunk 53. Accordingly central control 501 directs switching network 51 to release the connection between the second trunk appearance of dual access trunk 53 and the line appearance of land line 110. In addition the call record of temporary memory 502 is changed to identify that the communications path from mobile station MS1 is now provided on land line 210 and the first trunk appearance of dual access trunk 53. Central control 501 also transmits a release signal via MSC function translators 52 and data communication links 540 to mobile station controller 4, FIGS. 3A, 3B, and 3C. Stored program control system 46 upon receipt of the release signal deletes the assignment of the cell 1 radio channel and land line 110 from the status record of memory store 461. In addition, processor 460 transmits a channel release signal via peripheral translators 45, cell data channel radio translator 432 and the HDR lead of land data link 100 to cell radio center 11, FIGS. 2A and 2B. In response to the channel release signal the data channel control of cell data channel radio 115 signals the common control of mobile channel radio 116 to release the radio channel and land line 110.

C. Mobile Station Change of Cell Location to Cell Served by Different Mobile Switching Central Office During the course of a conversation a mobile station may move into a cell area served by a different mobile switching office than the office through which the present communication path has been established. For example, mobile MS1 currently located in cell area 2 and conversing over a communication path established through mobile switching central office 5 may move into cell area 8 which is served by mobile switching central office 6, FIGS. 1A and 1B. Mobile station controller 4 through the aforementioned monitoring sequence determines the new cell location of mobile station MS1 and transmits select control information over land data link 800 to cell radio center 81 to connect an idle two-way radio channel to land line 810. The new channel assignment is also transmitted via cell radio center 81 and the cell 8 radio data channel to mobile station MS1 for subsequent use. Mobile station controller 4 directs mobile switching central office 6 to establish a path connection in the manner previously described for a mobile station originating call from land line 810 through the switching network, a dual access trunk, an outgoing trunk of mobile switching central office 6 and over trunk facility 657 to mobile switching central office 5.

Mobile station controller 4 transmits the identification of trunk facility 657 and the assignment of the trunk facility to mobile station MS1 via MSC0 and MSC function translators 44 and 52 to control 50 of mobile switching central office 5, FIGS. 4A and 4B. Control 50 enters the new assignment information into the call record of temporary memory 502 and directs switching network 51 to establish a connection, FIG. 5D, from incoming trunk 57 through the trunk switches of switching network 51 to tandem junctor circuit 58 to the second trunk appearance of dual access trunk 53. Control 50, FIGS. 4A and 4B, also transmits a momentary ground via distributor 504 to the S3 lead of dual access trunk 53.

At the completion of transferring the communication path of mobile station MS1 from cell area 1 to cell area 2 the SR relay of dual access trunk 53 is released and the SW and SZ relays operated. The present communication path extends from the first trunk appearance over conductors T1 and R1 through parallel make contacts SW5, SZ7, SW6, SZ8 and normal contacts SR7 and SR8 to T and R conductors of the line appearance on switching network 51. Battery on the S3 lead of dual access trunk 53 operates the SR relay which magnetically latches operated. Ground through make contact SR1 and resistor R3 indicate to distributor 504 that the SR relay has operated. The operation of the SR relay places a holding ground on the S2 lead and the S1 lead through make contacts SR3 and SR4. Prior to the operation of the SR relay the SW and SZ relays are held operated by ground extending through make contacts SW1 to the coils of the SW and SZ relays and the corresponding R1 and R2 resistors to battery. The operation of the SR relay supplies ground through make contacts SR2 and SZ2 to shunt the SW relay coil. With ground on both sides of the coil winding relay SW releases and prepares to transfer the existing communication path to a new connection extending from the second trunk appearance over conductors T2 and R2 through break contacts SW7 and SW8 to T and R conductors of the line appearance on switching network 51. The path to the first trunk appearance is closed at this time through make contacts SZ7 and SZ8 since relay SZ is held operated by make contact SR2 and break contact SW2.

The channel transfer supervisory circuit 59, connected to the communication path via make contacts SR5 and SR6, notifies mobile station MS1 to retune to the new two-way radio channel assignment previously received by mobile station MS1 from mobile station controller 4. When retuning is acknowledged over land line 810, FIG. 5D, through MSC0 6, trunk 657, incoming trunk 57, switching network 51, tandem junctor 58, the second trunk appearance of dual access trunk 53 and channel transfer supervisory circuit 59, FIGS. 4A and 4B, via make contacts SR5 and SR6, break contacts SW7 and SW8; control 50 releases relay SR. Relay SR in releasing removes ground from the S1 lead of the first trunk appearance of dual access trunk 53 to release land line 210 connection to cell radio center 21. From the line appearance of dual access trunk 53 the communications path from mobile station MS1 is extended in the manner above set forth to called station LL2.

D. Terminating Call to a Mobile Station

Whenever a fixed telephone station such as station LL2, FIGS. 1A and 1B, desires to place a call to a mobile station, for example, mobile station MS1, the fixed telephone station user dials the directory number assigned to mobile station MS1. The dialed directory number in the conventional and well-known manner describes the geographical area wherein mobile station MS1 may normally be found. In addition, the directory number assigned to mobile station MS1 further identifies the mobile switching central office serving the cell areas to which mobile station MS1 has previously been assigned. Upon receipt of the dialed directory number, telephone central office 7 of the direct distant dialing network establishes a connection via two-way trunk 55 to mobile switching central office 5 and transmits the called directory number thereto.

Referring now to FIGS. 4A and 4B, scanner 505 detects a request for service on two-way trunk 55 and transfers the dialed directory number of mobile station MS1 to central control 501. Central control 501 interrogates temporary memory 502 for the existence of a call record for mobile station MS1. If such a record is present mobile switching central office 5 will in the conventional and well-known manner return a busy indication to calling telephone station LL2. In the absence of a previous call record central control 501 establishes a call record in temporary memory 502 and directs distributor 504 to transmit the called directory number via MSC function translators 52, data communication links 540, and MSC0 function translators 44 to mobile station controller 4, FIGS. 3A, 3B, and 3C. Scanner 451 of peripheral translators 45 detects the directory number stored in MSC0 function translators 44 and transfers the number information to stored program system 46 to establish a status record of the call in memory store 461. If the mobile station is indicated in this record as being busy through a mobile switching central office other than MSC0 5, information to that effect will be sent to control 50 of MSC0 5 so that a busy signal may be returned to the calling station. If mobile station MS1 is not indicated as being busy processor 460, in response to the programs of memory store 461, directs peripheral translators 45 to transfer the called directory number of mobile station MS1 to alerting function translator 42. Upon receipt of the called directory number in output register 4201, the parallel-to-serial converter transmitter 4200 transmits the called directory number in binary coded serial format over radio line 404 to alerting transmitter 40. The radio control of alerting transmitter 40 modulates the alerting radio transmitter with the called directory number of mobile station MS1 and directs the transmitter to transmit the directory number information over antenna 41 to all cell areas within the given geographical area. Although the present embodiment utilizes alerting radio equipment 40 it must also be recognized that the called mobile station MS1 directory number could be dispatched to all cell radio centers and transmitted over the cell assigned data channels of the given geographical areas.

In the event mobile station MS1 is not within the geographical area, or is not turned on, stored program control system 46 of mobile station controller 4 will return a don't answer signal to mobile switching central office 5 via MSC0 function translators 44, data communication lines 540, and MSC function translators 52. Control 50, FIGS. 4A and 4B, in response to the don't answer signal recorded in input register 5202, directs mobile switching central office 5 in the conventional and well-known manner to return an announcement over two-way trunk 55 to fixed telephone station LL2 informing the telephone station LL2 user that mobile station MS1 fails to respond.

Called mobile station MS1, if turned on, will respond to the alerting transmitter directory number signal by transmitting a seizure signal on the radio data channel associated with the strongest received radio data channel transmitted from a cell radio center. In the identical manner previously set forth in the location procedure for a mobile originated call sequence, mobile station controller 4 locates mobile station MS1 in a specific cell area and transmits select control information to the cell radio center of the cell wherein called mobile station MS1 is located. Assuming mobile station MS1 is located in cell area 1, FIGS. 1A and 1B, select control information is sent to cell radio center 11 and transmitted to mobile station MS1 to tune the mobile station transmitter and receiver to the selected idle two-way radio channel frequencies. In addition the select control information is utilized by cell radio center 11 in the aforementioned manner to establish a connection between the selected radio channel and one of the idle voice land lines 110.

Assignment information relating to called mobile station MS1 and voice land line 110 is transmitted by mobile station controller 4 to mobile switching central office 5, FIGS. 4A and 4B, via data communication link 540. The received assignment information is entered by control 50 into the call record recorded in temporary memory 502. Central control 501 in response to the stored program instructions of semi-permanent memory 503 utilizes the assignment information to establish a connection from an idle dual access trunk 53 trunk appearance through the line and trunk switches of switching network 51 to the line appearance of the assigned land line 110. Assuming that the SR, SW, and SZ relays of dual access trunk 53 are released central control 501, by means of scanner 505, has detected the obvious ground on the S2 lead and has directed switching network 51 to connect land line 110 to the T2 and R2 conductors of the second trunk appearance of the selected dual access trunk 53. Central control 501 also directs switching network 51 to establish a connection from the trunk appearance of two-way trunk 55 to the T and R conductors of the line appearance of the selected dual access trunk 53.

Mobile switching central office 5 in the conventional and well-known manner applies ringing signals to land line 110 to notify mobile station MS1 of the existence of an incoming call. When mobile station MS1, FIGS. 1A and 1B, goes off-hook to answer the incoming call a two-way communication path extends from calling telephone station LL2 through telephone central office 7 to the two-way trunk 55 of mobile switching central office 5. The path is continued through the line and trunk switches of switching network 51 to the line appearance of dual access trunk 53, FIGS. 4A and 4B, over the T and R conductors, through normal contact SR7 and SR8 and parallel normal SW7, SZ5 and SW8, SZ6 contacts, the T2 and R2 conductors to the second trunk appearance of dual access trunk 53. Switching network 51 extends the path from the T2 and R2 conductors through the line and trunk switches to the line appearance of land line 110 whereby the path is continued onto cell radio center 11. At cell radio center 11, FIGS. 2A and 2B, the path proceeds via a two-way radio channel from mobile channel radio 116 over antenna 10 to mobile station MS1.

In the event mobile station MS1, FIGS. 1A and 1B, travels into a new cell area, for example, cell area 2, mobile station controller 4 would proceed in the aforementioned manner to direct mobile switching central office 5 to establish a connection from the first trunk appearance of dual access trunk 53 to an assigned land line 210 and switch the communication path from cell area 1 to cell area 2 by operating the SR relay of dual access trunk 53. Thus, as in an originating call situation, a mobile station may move from one cell location to another during a call completing to the mobile station.

E. Mobile Station Call to Another Mobile Station

The present mobile telephone switching system is arranged so that one mobile station may call another mobile station regardless of their cell area locations. In addition, a communication path established between the two mobile stations is continuously maintained even though one, or both, of the mobile stations change cell area locations. Referring now to FIGS. 1A and 1B it is assumed that mobile station MS1 is located in cell area 1 and that a call is to be placed from mobile station MS1 to mobile station MS2 located in cell area 2.

When mobile station MS1 goes off-hook to originate a call to mobile station MS2 a dial tone connection, FIG. 5A, is established in the aforementioned manner from mobile station MS1 to cell radio center 11 and over land line 110 to switching network 51 of mobile switching central office 5. The connection is continued from the line appearance of land line 110 through switching network 51 to the second trunk appearance of a first dual access trunk 53. The path is continued through the first dual access trunk 53 and from the corresponding line appearance through switching network 51 to customer digit receiver 56. Upon the receipt of dial tone the mobile station MS1 user in the usual and conventional manner dials the directory number of mobile station MS2 over the above path into customer digit receiver 56.

Central control 501, FIGS. 4A and 4B, receives the dialed directory number from customer digit receiver 56 via scanner 505 and determines from a translation of the directory number that the call is to be directed to mobile station MS2. If called mobile station MS2 is conversing on a previous call connection mobile switching central office 5 will return a busy indication to calling mobile station MS1. In the absence of a call record for mobile station MS2 mobile switching central office 5 transmits the called directory number to mobile station controller 4 via data communication link 540. Upon receipt of the called directory number mobile station controller 4, FIGS. 3A, 3B, and 3C, in the previously set forth manner for a terminating call, pages mobile station MS2 over alerting transmitter 40. When answering mobile station MS2 has been located in cell 2 mobile station controller 4 assigns an idle radio channel and an idle land line 210 for use by mobile station MS2. The assignment information relating to mobile station MS2 and land line 210 is also transmitted to mobile switching central office 5, FIGS. 4A and 4B, via data communication link 540.

Control 50 enters the received assignment information into the call record of temporary memory 502 and directs scanner 505 to select a second dual access trunk 53. Assuming that the selected second dual access trunk 53 has SR relay released and the SW and SZ relays operated, central control 501 will direct switching network 51 to establish a connection, FIG. 5E, through the line and trunk switches from the first trunk appearance of the second dual access trunk 53 to land line 210. In addition, mobile switching central office 5 under program instructions directs switching network 51 to establish a connection from the line appearance of the first dual access trunk 53 connected to land line 110, through the line switches of switching network 51 to a first line appearance of junctor circuit 54, through junctor circuit 54 and the line switches of switching network 51 to the line appearance of the second dual access trunk 53 connected to land line 210.

Figures 5E, 5F:
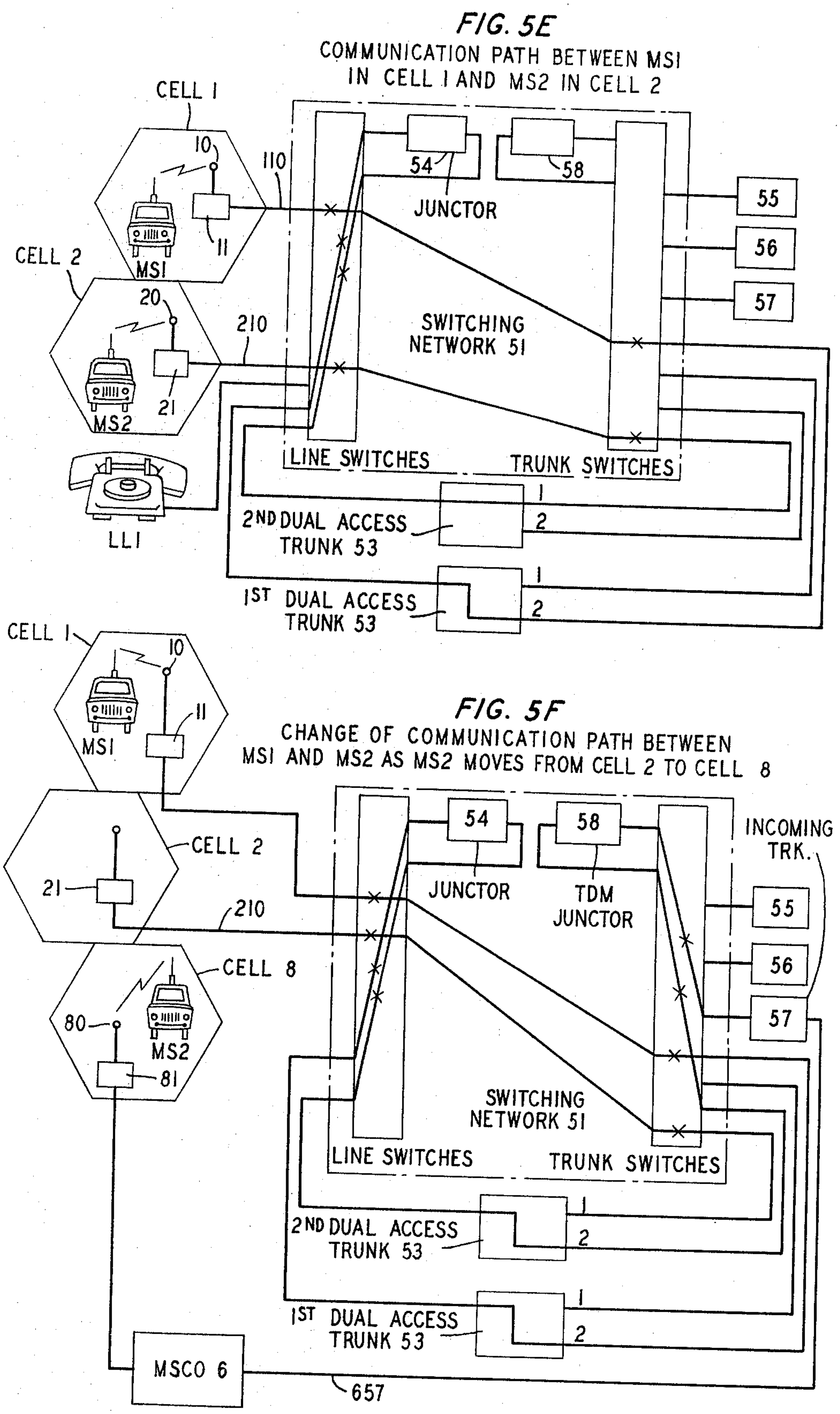

When called mobile station MS2 goes off-hook to answer the incoming call from mobile station MS1 a two-way communication path, FIG. 5E, extends from calling mobile station MS1 located in cell 1 over an assigned radio channel to cell radio center 11. The communication path is continued from cell radio center 11 over land line 110 to mobile switching central office 5, through the line and trunk switches of switching network 51 to the second trunk appearance of the first dual access trunk 53. From the second trunk appearance the connection extends to the line appearance on switching network 51. Continuing, the two-way communications path extends from the line appearance of the first dual access trunk through the line switches of switching network 51 to a first appearance of junctor 54, through junctor 54 and the line switches of switching network 51 to the line appearance of the second dual access trunk. The communication path further extends from the line appearance to the first trunk appearance of the second dual access trunk on switching network 51. Finally, the two-way communication path is continued from the first trunk appearance through the trunk and line switches of switching network 51, to the line appearance of selected land line 210, over land line 210 to cell radio center 21 and over the mobile channel radio via a radio channel to called mobile station MS2.

A communication path is provided between mobile stations on a connection that extends through a tandem connection of dual access trunks 53 in order to allow the mobile stations to change cell locations without interrupting a conversation on the communications path. Referring to FIG. 5E assume that mobile station MS1 changes location from cell 1 to cell 2. Mobile station controller 4 in the aforementioned manner determines the new cell location of mobile station MS1 and directs cell radio center 21 and mobile switching central office 5 to assign an idle radio channel and land line 210 for use by mobile station MS1 and to connect the assigned land line 210 to the first trunk appearance of the first dual access trunk. Mobile switching central office 5 then directs the first dual access trunk to transfer the communication path from the second trunk appearance to the first trunk appearance. The transfer also directs mobile station MS1 to retune to the assigned radio channel of cell 2. During the transfer filter 531, FIGS. 4A and 4B, is inserted into the communication path to prevent the returning signals intended for mobile station MS1 from reaching mobile station MS2 through junctor circuit 54. In a similar manner mobile station MS2 can change cell locations and mobile switching central office 5 will transfer the existing communication path from the first trunk appearance to the second trunk appearance of the second dual access trunk.

Should a mobile station conversing with another mobile station travel into a cell area served by another mobile switching central office, for example, mobile station MS2 travels into cell 8, mobile station controller 4 directs MSC06, FIG. 5F, in the previously set forth manner to establish a connection from cell radio center 81 through a dual access trunk located in MSC06 (not shown) over trunk facility 657 to mobile switching central office 5. Mobile switching central office 5, in accordance with information received from mobile station controller 4, directs switching network 51 to establish a connection through trunk switches from incoming trunk 57, through tandem junctor 58 to the second trunk appearance of the second dual access trunk 53 priorly assigned to handle mobile station MS2 in cell 2. Control 50 of mobile switching central office 5 also directs the second dual access trunk 53 to switch the communications path over the old connection to cell 2 from the first trunk appearance in the aforementioned manner to a new connection extending from the second trunk appearance over incoming trunk 57 via MSC06 to cell 8.

Thus, on a mobile station call to another mobile station the use of two dual access trunks connected in tandem through their line appearances enable both calling and called mobile stations to move into and out of different cell locations served by different mobile switching central offices by utilizing one trunk appearance to establish a connection to a first cell and then switching the communication path to the other trunk appearance for a connection to the new cell location.

SUMMARY

It is obvious from the foregoing that the facility, economy, and efficiency of mobile communication switching systems may be substantially enhanced by the provision of an electronic data processor capable of locating mobile stations and controlling the establishment and maintenance of communication paths between mobile stations and between mobile stations and fixed telephone stations. It is further obvious from the foregoing that the aforesaid electronic data processor's unique feature of enabling mobile switching central offices to provide continuity of conversation by switching an existing communications path from one fixed base station to another, obviates the need for interrupting the conversation and transferring the communication path to a mobile operator during a change of radio coverage areas.

While the equipment of my invention has been disclosed in a mobile communication switching system, it is to be understood that such an embodiment is intended to be illustrative of the principles of my invention and that numerous other arrangements may be devised by those skilled in the art without departing from the spirit and scope of the invention.

For example, the present system could be used with an international television relay system employing a moving communications satellite and ground relay systems wherein each ground relay system comprises a television station connected to the line port of a dual access trunk and a switching network connected to the trunk ports for connecting ground communicating stations to either of the two trunk ports. As the communications satellite moves between two ground relay systems the electron data processor controls the switching networks to switch the proper ground communicating station to the trunk's ports of the dual access trunk to maintain a continuous video path between two television stations.

I claim:

1. In a communication system
a plurality of mobile stations,
a plurality of base stations each located in a designated cell area and each comprising apparatus for defining channels for communicating with said mobile stations,
means common to said base stations for ascertaining locations of designated ones of said mobile stations in any of said cell areas,
means activated by said ascertaining means in accordance with said locations of said designated mobile stations for establishing connections to said base stations and said channels to provide communication paths to said designated mobile stations,
means for periodically monitoring said communication paths to determine changes of locations of said designated mobile stations, and
means activated by said monitoring means in accordance with a change of locations of one of said designated mobile stations for causing said connection establishing means to rearrange the connection of said base stations and said channels for said one designated mobile station to continuously maintain said communication paths.

2. In a communication system
the invention defined in claim 1 wherein said ascertaining means comprises
first means individual to each of said base stations for communicating with said designated mobile stations while said designated mobile stations are within the area designated by said base station,
second means individual to each said base station for communicating with said designated mobile stations when said designated mobile stations are outside the area designated by said base station, and
means operative by both said first and said second communicating means for determining the area locations of said designated mobile stations.

3. In a communication system
the invention defined in claim 2
wherein said first communicating means for a particular one of said base stations comprises first radio means defining a signaling channel exclusive to said particular base station,
wherein said second communicating means of said particular base station comprises second radio means defining said signaling channels associated with base stations adjacent to said particular base station, and
wherein said determining means includes means for registering the identity of said signaling channels over which said designated mobile stations are signaling.

4. In a communication system
the invention defined in claim 3 wherein said determining means comprises stored program control means common to said first and said second radio means for deriving the cell area location of said designated mobile stations from said registered channel identities.

5. In a communication system
the invention defined in claim 1 wherein said connection establishing means comprises means responsive to signals from calling ones of said designated mobile stations for alerting called ones of said designated mobile stations in all of said cell areas.

6. In a communication system
the invention defined in claim 1 wherein said connecting establishing means comprises
communication links coupled to the base stations of said cell areas for connection to said designated mobile stations, and
means common to said plurality of base stations for selectively connecting any one of said communication links to any other said communication link.

7. In a communication system
the invention defined in claim 6 wherein each of said communication links comprises a channel component corresponding to an individual base station and wherein said monitoring means comprises
receiving means at each said base station for monitoring said channel components, and
means at each said base station for identifying the direction from said base station of said monitored channel components over which said designated mobile stations are communicating.

8. In a communication system
the invention defined in claim 7
wherein said receiving means comprises a radio receiver selectively tunable to said channel components corresponding to said base station and to said channel components corresponding to said adjacent base stations, and
wherein is also provided interrogating means for periodically tuning said radio receivers to said channel components of said established communication paths.

9. In a communication system
the invention defined in claim 8
wherein said identifying means at a particular one of said base stations comprises
directional antenna means corresponding to said adjacent base stations, and
means for generating a coded signal identifying enabled ones of said antenna means, and
wherein said rearranging means comprises means for periodically registering said coded signals.

10. In a communication system
the invention defined in claim 9
wherein said rearranging means further comprises means for comparing previously registered ones of said coded signals with currently registered ones of said coded signals to ascertain the movement of said designated mobile stations from first ones of said cell areas to second ones of said cell areas.

11. In a communication system
the invention defined in claim 10
wherein said connection establishing means further comprises first ones of said communication links coupled to the base stations of said first cell areas for connection to said designated mobile stations, and
wherein said rearranging means also comprises
means responsive to said comparing means for selecting second ones of said communication links coupled to the base stations of said second cell areas for connection to said designated mobile stations, and
means for transferring the connections of said designated mobile stations from said first communication links to said second communication links as said designated mobile stations change cell locations.

12. In a communication system
the invention defined in claim 11
wherein said transferring means includes a trunk means comprising
a line appearance terminating one of said designated mobile stations,
a first trunk appearance terminating one of said first communication links,
a second trunk appearance terminating one of said second communication links, and
means responsive to said comparing means for selectively connecting said line appearance to said first and said second trunk appearances.

13. In a mobile communication system
a plurality of mobile stations,
a plurality of base stations each located in a designated cell area and each comprising apparatus for defining channels for communicating with said mobile stations,
radio means individual to each of said base stations for communicating with designated ones of said mobile stations,
processor means connected to said radio means for ascertaining the cell area locations of said designated mobile stations,
switching means common to said base stations for establishing connections to said base station apparatus to provide communication paths on said channels to said located mobile stations,
monitoring means responsive to said processor means for selecting ones of said channels to determine changes of locations of said designated mobile stations, and
means located in said switching means and activated by said processor means in accordance with said changes of locations for rearranging the connections of said base station apparatus to continuously maintain said communication paths.

14. In a mobile communication system
the invention defined in claim 13 wherein said rearranging means comprises trunk means having a line appearance and dual trunk appearances selectively connectable to said base station apparatus for connecting a first one of said designated mobile stations through said line appearance to said trunk appearances connected to a second one of said designated mobile stations.

15. In a mobile communication system
the invention defined in claim 14 wherein said trunk means comprises
means for selectively connecting said line appearance to a first one of said trunk appearances to form one of said communication paths between said first and said second mobile stations,
means activated by said processor means in accordance with a change of location of said second mobile station for directing said connecting means to couple a second one of said trunk appearances connected to one of said base station apparatus to said one communication path,
means connected by said directing means to said one communication path for signaling said second mobile station to select one of said channels associated with said one base station apparatus, and
means effective upon the de-activation of said directing means for enabling said connecting means to open said connection extending from said line appearance to said first trunk appearance.

16. In a mobile communication system
the invention defined in claim 15 wherein said directing means comprises a magnetic latching relay operated by a first polar signal and released by a second polar signal.

17. In a mobile communication system
the invention defined in claim 16 wherein said signaling means comprises
channel transfer supervisory means for transmitting and receiving control signals between said trunk means and said second mobile station, and
means enabled by the operation of said latching relay for coupling said supervisory means across the connection extending from said line appearance to said trunk appearances.

18. In a mobile communication system
the invention defined in claim 16 wherein said signaling means comprises
a filter operable to inhibit the passage of electrical signals corresponding to control signals transmitted between said signaling means and second mobile station, and
means enabled by the operation of said latching relay for inserting said filter in series with the connection extending from said line appearance to said trunk appearances.

19. In a mobile communication system
the invention defined in claim 16 wherein said connecting means comprises
a first and second relay,
a first control path enabling one of said trunk appearances and comprising break contacts of said first and said second relays,
a second control path enabling the other said trunk appearance and comprising make contacts of said first and said second relays,
a third control path enabling both said trunk appearances and comprising make contacts of said latching relay,
a first transmission path connecting said line appearance to said enabled one trunk appearance and comprising further break contacts of said first relay connected in parallel with further break contacts of said second relay,
a second transmission path connecting said line appearance to said enabled other trunk appearance and comprising further make contacts of said first relay connected in parallel with further make contacts of said second relay, and
means including further make contacts of said latching relay for operating and releasing said first and said second relays.

20. In a mobile telephone communication system having a mobile station and a telephone station the combination comprising
a data processor;
a plurality of base stations each located in a designated cell area and each including apparatus for defining channels for communicating with said mobile station,
a plurality of transmission lines selectively connectable to said channel apparatus,
a plurality of directional antennas,
a radio transmitter connected to said antennas for continuously transmitting a first signal individual to each said base station,
a radio receiver connected to said antennas for receiving a second signal individual to each of said base stations from said mobile station enabled by said first signal,
a plurality of monitor receivers connected to said antennas for receiving said second signal from said enabled mobile station located in adjacent cell areas,
a selective receiver connected to said antennas for monitoring one of said channels selected by said data processor to detect a movement of said enabled mobile station from a first cell location to a second cell location, and
a plurality of data generators connected to said monitor receivers and to said selective receiver for identifying enabled ones of said antennas;
a controller connected to said base stations and including said data processor for computing the cell location of said enabled mobile station from a plurality of antenna identifying signals received from those base stations surrounding said enabled mobile station;
a first switching network activated by said controller in accordance with said first cell location for connecting a first one of said channel apparatus to a first one of said transmission lines;
a switching office connected to said transmission lines and activated by dialing signals received from said enabled mobile station on said first transmission line for connecting said first transmission line to said telephone station to form a communication path between said enabled mobile station and said telephone station;
a second switching network activated by said controller in accordance with said second cell location for connecting a second one of said channel apparatus to a second one of said transmission lines; and
means located in said switching office and activated by said controller in accordance with change of location signals from said processor for transferring the connection between said mobile station and said telephone station from said first transmission line to said second transmission line to continuously maintain said communication path.

* * * * *